United States Patent [19]
Walsh et al.

[11] Patent Number: 5,912,888
[45] Date of Patent: *Jun. 15, 1999

[54] DIGITAL NETWORK ACCESS SERVER

[75] Inventors: Dale M. Walsh, Golf, Ill.; Andrew L. Norrell, Nevada City, Calif.; Donald C. Balton, Grayslake, Ill.; Terrel L. Jones, Des Plaines, Ill.; Marc S. Baum; Robert C. Suffern, both of Chicago, Ill.; Christopher R. Hansen, Grass Valley, Calif.; Jeffrey E. Herman, Zion, Ill.; Thanh Q. Ngo, Chicago, Ill.; Daniel L. Schoo, Island Lake, Ill.; Gregory Warren Goodknight, Nevada City, Calif.

[73] Assignee: U.S. Robotics Access Corp., Rolling Meadows, Ill.

[*] Notice: This patent is subject to a terminal disclaimer.

[21] Appl. No.: 08/920,543

[22] Filed: Aug. 27, 1997

Related U.S. Application Data

[63] Continuation of application No. 08/656,812, Jun. 3, 1996, which is a continuation of application No. 08/557,898, Nov. 14, 1995, Pat. No. 5,528,595, which is a continuation of application No. 08/257,735, Jun. 9, 1994, abandoned.

[51] Int. Cl.$^6$ .......................... H04L 12/46; H04M 11/00
[52] U.S. Cl. ...................... 370/355; 370/402; 379/93.31
[58] Field of Search .................................. 370/401, 402, 370/465, 466, 352, 355; 379/93.01, 93.05, 93.06, 93.31

[56] References Cited

U.S. PATENT DOCUMENTS

| | | | |
|---|---|---|---|
| 4,796,292 | 1/1989 | Thomas | 379/91.01 |
| 4,991,169 | 2/1991 | Davis et al. | 370/463 |
| 5,237,561 | 8/1993 | Pyhalammi | 370/244 |
| 5,315,641 | 5/1994 | Montgomery et al. | 379/91.01 |
| 5,347,516 | 9/1994 | Yoshida | 370/401 |
| 5,361,259 | 11/1994 | Hunt et al. | 370/402 |
| 5,374,952 | 12/1994 | Flohr | 348/12 |
| 5,410,754 | 4/1995 | Klotzbach et al. | 370/466 |
| 5,428,608 | 6/1995 | Freeman et al. | 370/261 |
| 5,517,556 | 5/1996 | Pounds et al. | 379/88.25 |

OTHER PUBLICATIONS

Hugh White, "A T-1 Based DSP Modern for Interfacing Voice and Packet Networks," IEEE Journal, 1988.
Paul Desmond, "Primary Access Adds PAD to Network Access System," Network World, p. 17, Mar. 4, 1991.
M. Pecen et al., "A Bi-Directional Wire to Local Area Network Interface Module: Summary of Functional Requirements and Fundamental Architecture," Jan. 18, 1994.
M. Pecen et al., "A Bi-Directional Wire Line to Local Area Network Interface and Method: Prototype Specifications," Aug. 10, 1993.
Primary Access Corp., Overview of Primary Access network acess system (circa 1992).
Primary Access Corp., Primary Access System Training Manual (circa Feb. 1993).

*Primary Examiner*—Min Jung
*Attorney, Agent, or Firm*—McDonnell Boehnen Hulbert & Berghoff

[57] ABSTRACT

Apparatus and method for enabling bilateral transmission of digital data between a local area network and telephone company networks employing both analog and digital telephone lines. A modem modulates signals responsive to signals from a local area network representing an outgoing call to form digital telephone signals suitable for transmission by a telephone line and suitable for demodulation by receiving analog modems. A circuit switched time division multiplex bus transmits the digital telephone signals to the telephone line. The modem also demodulates incoming digital telephone signals to form digital network bus signals divided into packets. A packet bus transmits the digital network bus signals to a network interface which processes the signals and transmits them to the local area network.

7 Claims, 25 Drawing Sheets

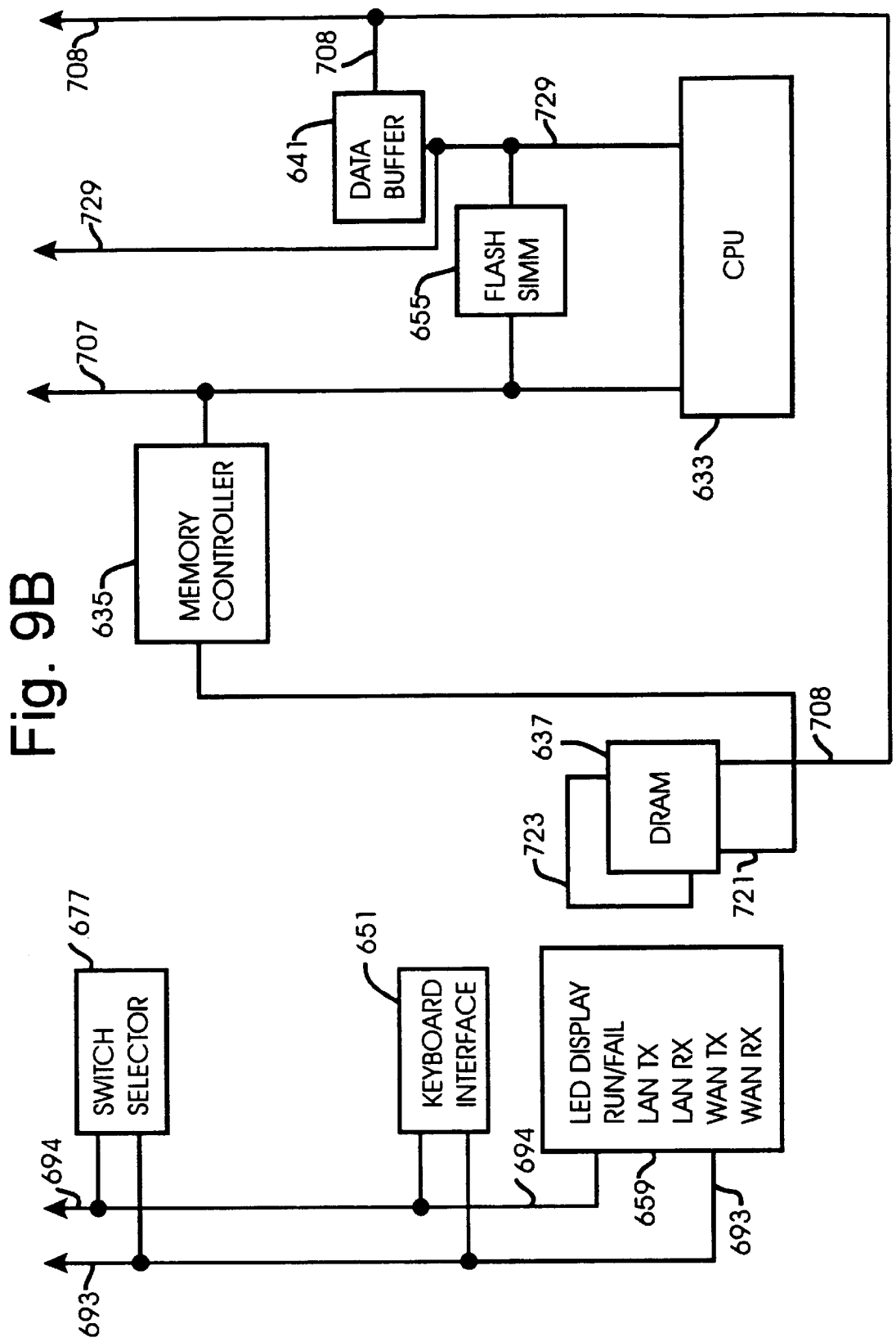

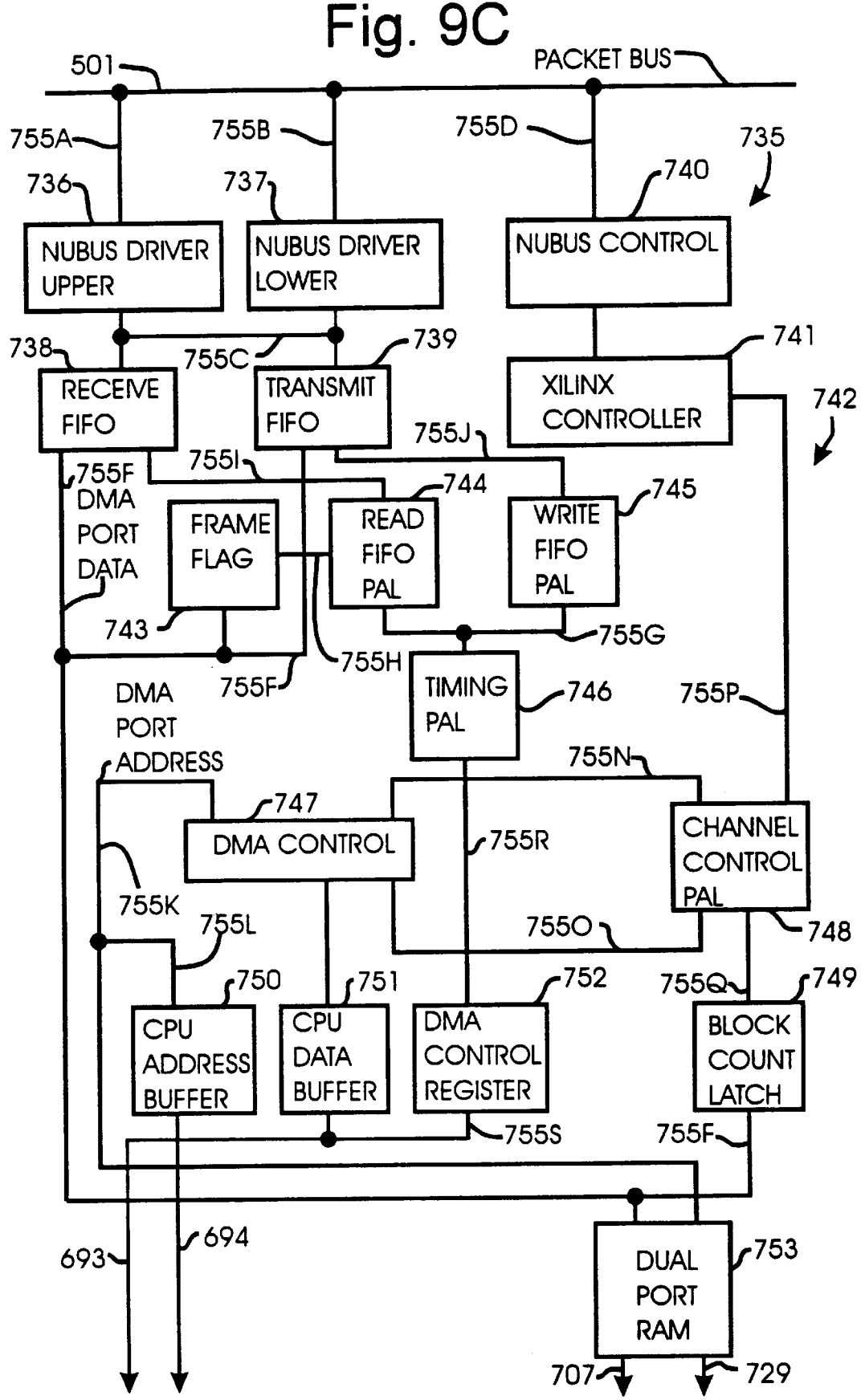

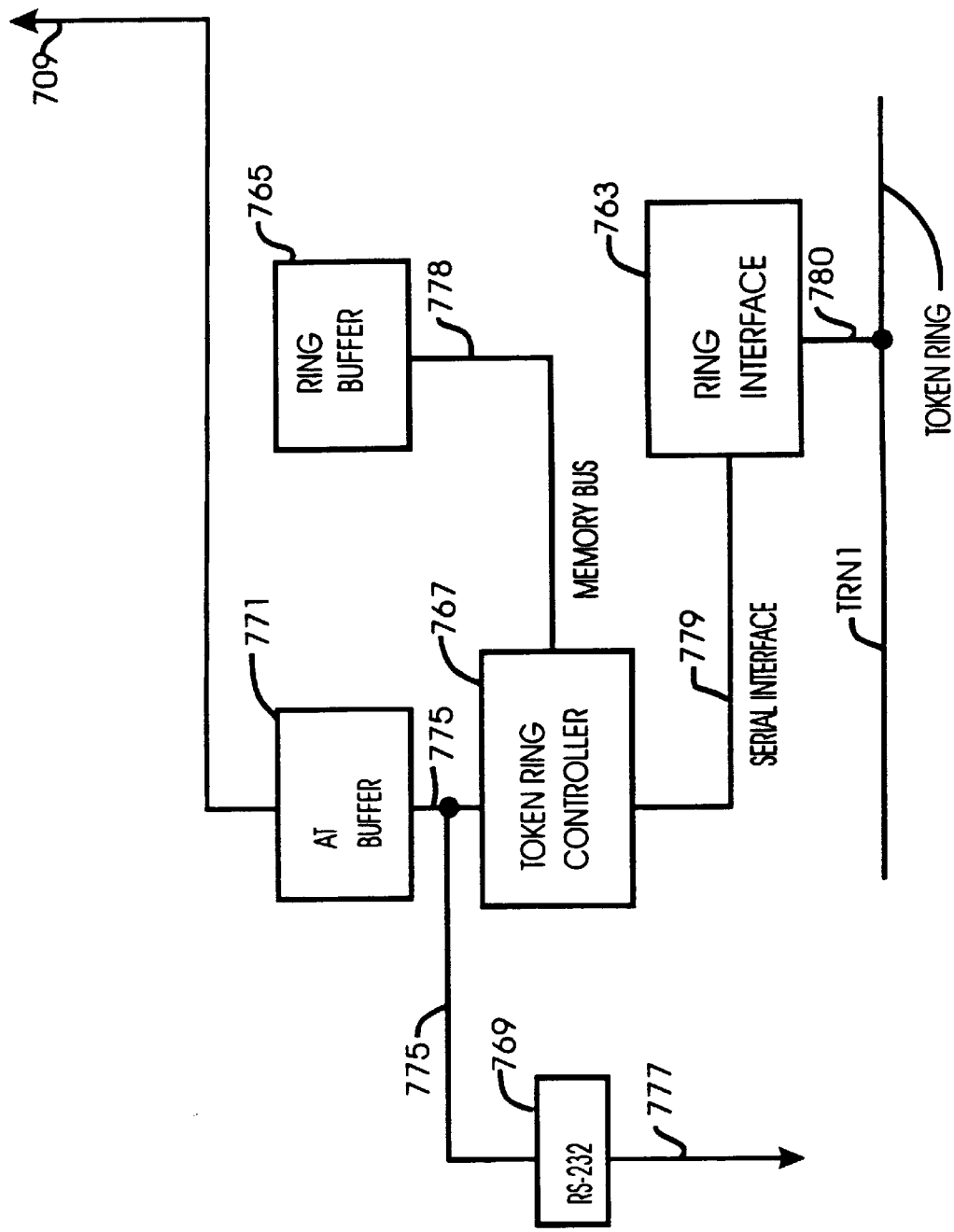

INCOMING CALL FROM TELEPHONE COMPANY

OUTGOING CALL FROM MODEM pBusAPI State Transition Diagram

Fig. 15 COMMAND CONTROL BLOCK (CCB)

| Offset | | | |
|---|---|---|---|
| +0 | SIGNATURE CCB_SIG | | |
| +4 | COMMAND CODE CCB_CMD | MODEM ID CCB_MID | FLAGS CCB_FLAGS |
| +8 | CBX ADDRESS CCB_CBX | | |
| +12 | CBX ADDRESS CCB_CBX | NEXT CBX ADDRESS CCB_CCB | |
| +16 | NEXT CBX ADDRESS CCB_CCB | | |
| +20 | DE CCB_DE | RC CCB_RC | RCS CCB_RCX |

Fig. 16 COMMAND BLOCK EXTENSION (CBX)

| Offset | | |
|---|---|---|
| +0 | FLAGS CBX_FLAGS | BYTE COUNT (OF DATA OR FOB) CBX_BCOUNT |
| +4 | ADDRESS OF XMIT/RECV BUFFER OR FOB CBX_BUFF_FOB | |
| +8 | CBX_BUFF_FOB | TIMER-1 CBX_TIMER1 |
| +12 | TIMER-1 CBX_TIMER1 | TIMER-2 CBX_TIMER2 |
| +16 | TIMER-2 CBX_TIMER2 | NOT USED |

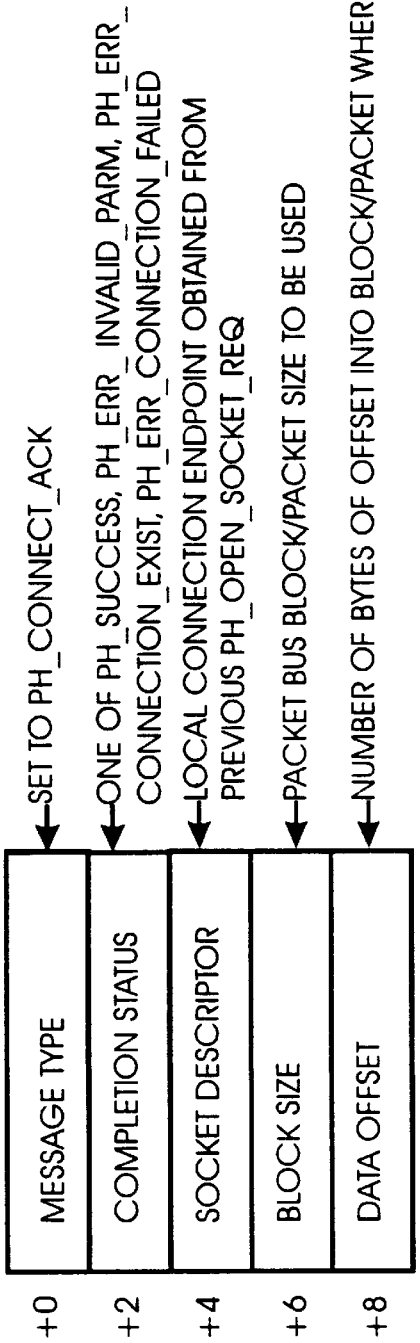
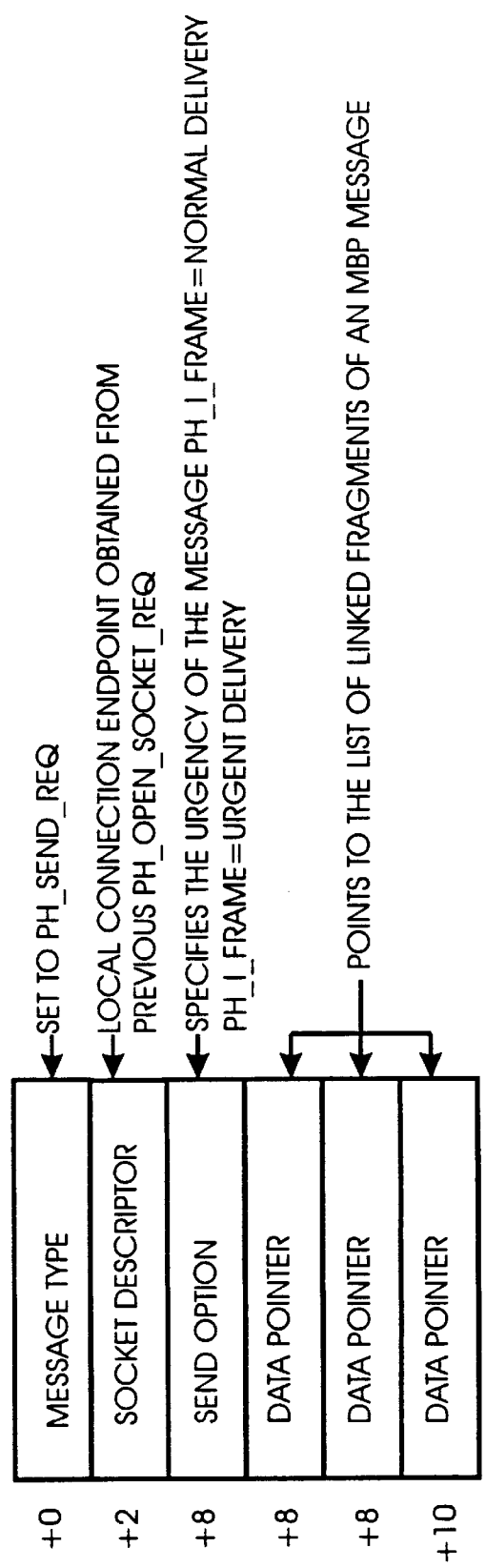

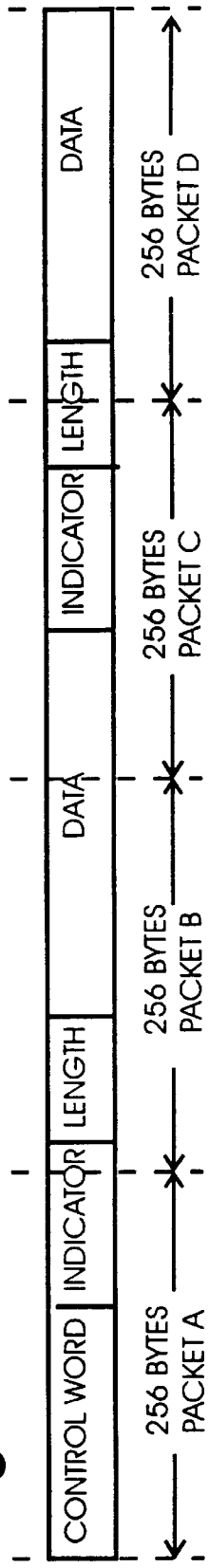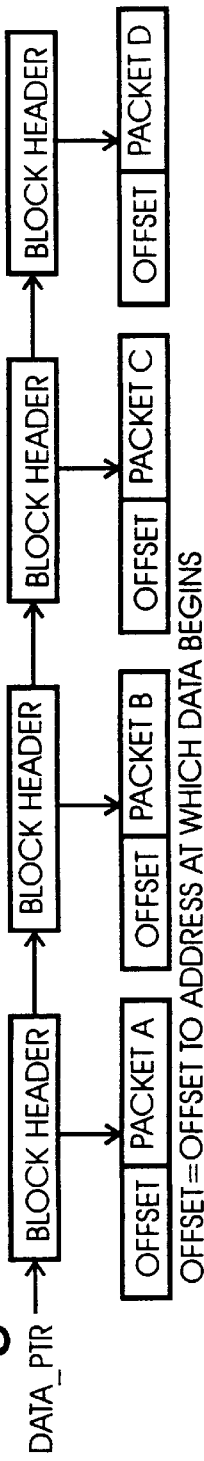

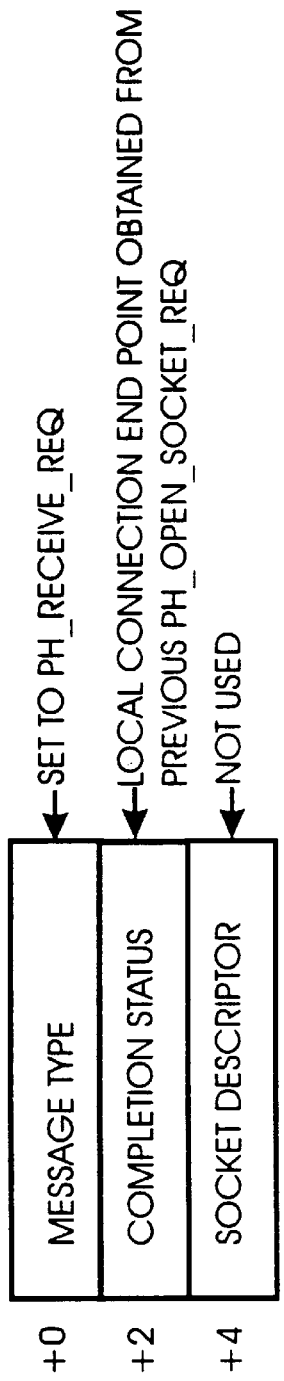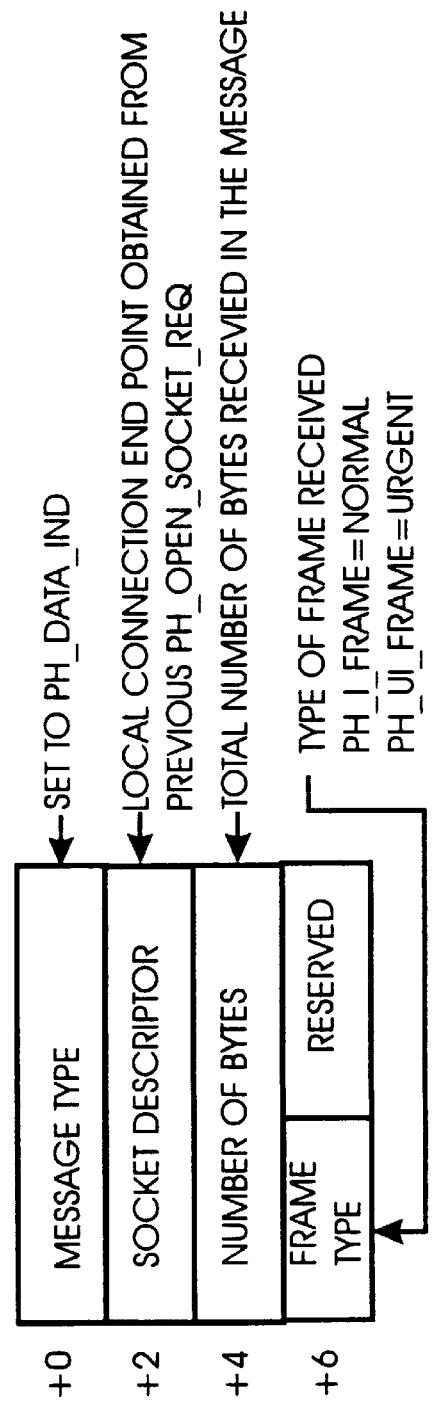

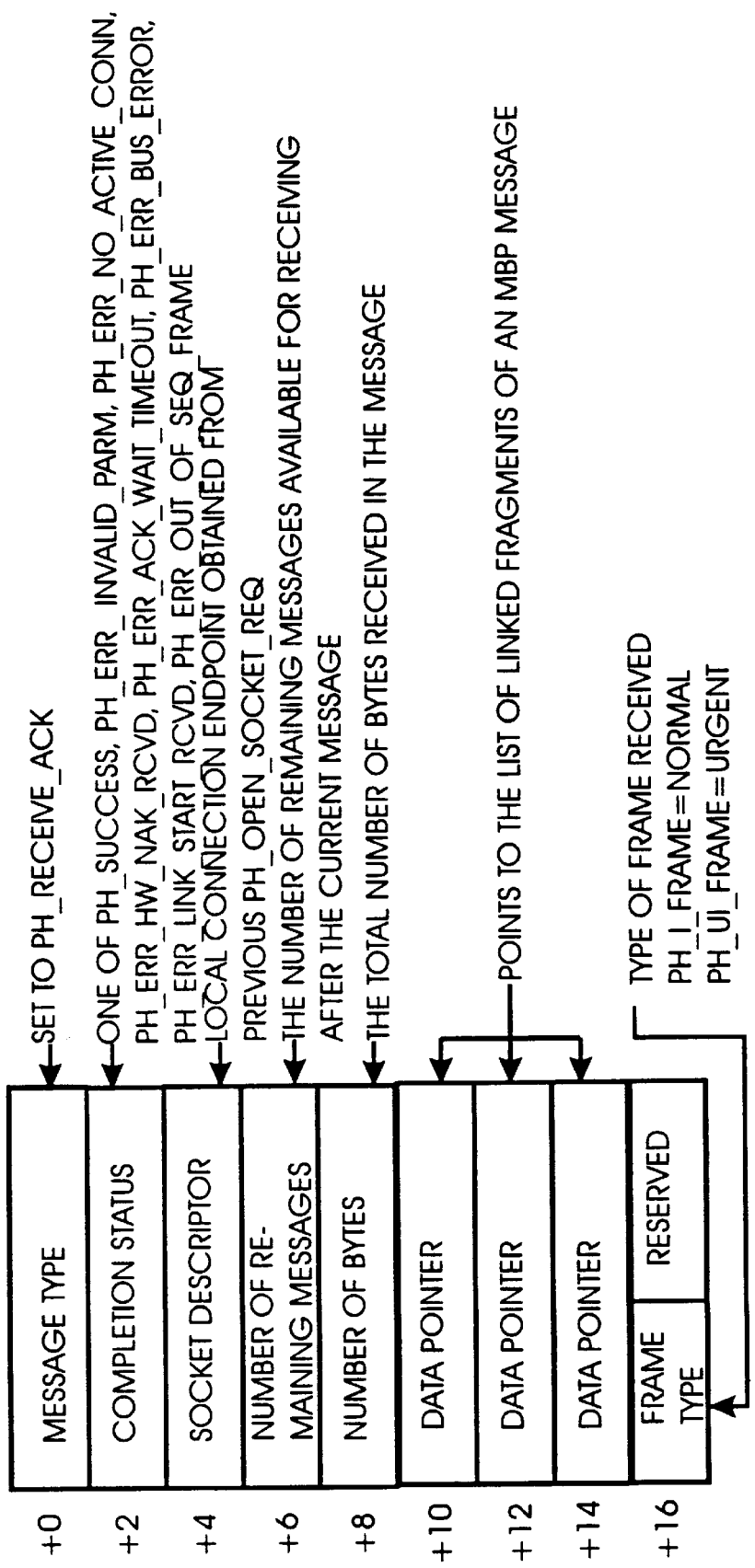

DIGITAL NETWORK ACCESS SERVER

This is a continuation of application Ser. No. 08/656,812 filed Jun. 3, 1996, which is a continuation of application Ser. No. 08/557,898 filed Nov. 14, 1995 now U.S. Pat. No. 5,520,595, which is a continuation of application Ser. No. 08/257,735 filed Jun. 9, 1994, now abandoned.

FIELD OF THE INVENTION

This invention relates to modems for enabling data communication between multiple data signal sources over a combination of analog and digital telephone company lines, and more particularly relates to techniques for processing signals at the inputs and outputs of such modems.

DESCRIPTION OF THE PRIOR ART

FIG. 1 describes prior art for enabling communication between computers connected to analog telephone lines and computers coupled together over a digital network. Digital computers C1–C12 communicate with a telephone company network TC1 via conventional modems M1–M12, respectively. Each of computers C1–C12 is a separate source of digital data signals representing digital data. In a well known manner, modems M1–M12 convert the digital data signals into corresponding analog telephone signals for transmission over conventional pairs of analog telephone wires A1–A12, respectively. The analog telephone wires typically extend to a telephone company central station at which the analog telephone signals are converted to digital telephone signals for transmission and switching through the telephone company digital network. The telephone company typically uses a digital conversion called CODEC which samples the analog telephone signals at 8,000 samples per second using 8 digital bits per sample.

The resulting digital telephone signals typically are transmitted over a four wire digital telephone span line commonly called a T1 line. Each T1 telephone line carries 24 digital channels that are multiplexed onto the T1 lines by a well known time division multiplex technique. For each of the digital channels, the telephone company adds layers of call set-up information according to the conventions established by the International Standards Organization (ISO). The call set-up information typically includes the telephone number being called.

Assuming the twelve digital channels of information representing data from computers C1–C12 are directed to a single user location, they typically will be switched to digital telephone line T1 which is terminated by a PBX box P1 at the user's location. PBX box P1 demultiplexes the 24 channels of digital telephone signals on line T1 and converts each digital signal to a corresponding analog telephone signal. Thus, the 24 channels of multiplexed digital telephone signals on line T1 are divided into 24 separate analog telephone signals on 24 separate pairs of analog telephone lines. Twelve pairs of the analog telephone lines A13–A24 are represented in FIG. 1 as inputs to conventional modems M13–M24. Modems M13–M24 are identical to modems M1–M12.

For incoming calls on line T1 from computers C1–C12, modems M13–M24 demodulate the analog telephone signals and covert them into digital data signals. The digital data signals typically are in a serial digital form suitable for transmission through an RS-232 digital port. Each of the twelve channels for modems M13–M24 may be connected to a terminal server TS1. Such servers have software and an output port which distribute data on a local area network, such as token ring network TRN1, among computers, such as computers C13–C24.

As shown in FIG. 1, analog telephone signals are used to represent digital data at two different points in the system, i.e., analog conductors A1–A12 and analog conductors A13–A24. Conversion between digital and analog signals occurs twice irrespective of whether a telephone call is incoming or outgoing.

For an incoming call from computers C1–C12, modems M1–M12 convert the digital data signals from the computers to analog telephone signals that are transmitted to the telephone company network TC1. Network TC1 converts the analog telephone signals to corresponding digital telephone signals. At the receiving station, PBX unit P1 converts the digital telephone signals to analog telephone signals that are demodulated by modems M13–M24 to generate network digital data signals suitable for use by server TS1 and computers C13–C24.

For outgoing calls from computers C13–C24, the network digital data signals generated by the computers are converted to corresponding analog telephone signals by modems M13–M24. The analog telephone signals are converted by PBX unit P1 to digital telephone signals suitable for transmission on the T1 line. After transmission in digital form, network TC1 converts the digital telephone signals into analog telephone signals that are transmitted over analog telephone lines A1–A12. The analog telephone signals are demodulated by modems M1–M12 and are converted to digital form for use by computers C1–C12.

The data from computers C1–C24 appears in RS-232 form at two points in the system, i.e., on one set of conductors connected to modems M1–M12 and on another set of conductors connected to modems M13–M24. Before signals originating at computers C1–C12 can be used on network TRN1, the RS-232 form of the signals at modems M13–M24 must be converted to blocks of digital data suitable for transmission on network TRN1.

The applicant has found that the prior art requirement for twice converting signals between digital and analog form and twice converting signals to and from RS-232 form in order to allow digital data sources to communicate via telephone company networks is inefficient and expensive. In addition, the need for separate busses for the distribution of data from modems M13–M24 to terminal server TS1 creates time delays and requires substantial duplication of circuitry.

In Hugh E. White, "A T1-Based DSP Modem For Interfacing Voice And Packet Networks" (IEEE 1988), an all digital system converts PCM samples on a T1 trunk to and from data bits on a virtual circuit of an X.25 trunk. However, the described structure of the system is insufficient to enable the high speed transfer of data between multiple modems with sufficient flexibility to provide efficient utilization of the modems for different applications.

In Paul Desmond, "Primary Access adds PAD To Network Access System," (*Network World*, p. 17, Mar. 4, 1991), certain functions of a network access system are identified. Output from DSP cards which perform a modem function is said to route to DCP cards over an RS-232 interface. The DCP cards are said to perform a packetizing function. This arrangement also is not sufficiently flexible or fast enough to properly utilize the capabilities of the DSP cards.

SUMMARY OF THE INVENTION

In order to overcome the deficiencies of the prior art, a primary object of the invention is to create a bus structure that increases the efficiency of data communication between one group of computers connected to analog telephone lines and a second group of computers connected to a local area network.

Another object of the invention is to demodulate telephone signals to form packets of signals that can be stored and analyzed to facilitate the demodulation of the telephone signals.

Still another object of the invention is to reduce the number of conversions between digital and analog form required for communication by digital data sources via telephone company networks employing both analog and digital telephone lines.

Still another object of the invention is to provide an improved bus for transmitting signals between a single digital telephone line and a plurality of modems.

Yet another object of the invention is to provide a bus of the foregoing type which employs a switch enabling bidirectional transmission of either (1) data from or to a telephone line; or (2) control signals under the control of a processing unit.

Still another object of the invention is to provide an improved bus for transmitting signals between a single local area network and a plurality of modems.

Yet another object of the invention is to provide a modem system in which communication channels are coupled from a telephone line to the modems over a circuit switched time division multiplex bus and in which data is coupled from the modems to a network over a parallel bus.

The invention is useful in a system comprising a multiplexed digital telephone line carrying a digital first telephone signal resulting from modulation by a first analog modem of a first digital computer signal. The signal represents digital first data from a digital first computer. The telephone line also carries a digital second telephone signal resulting from modulation by a second analog modem of a second digital computer signal. The signal represents digital second data from a digital second computer.

The system also comprises a network for transmitting a digital first network signal comprising blocks of digital time-spaced signals representing digital third data from a digital third computer and for transmitting a digital second network signal comprising blocks of digital time-spaced signals representing digital fourth data from a digital fourth computer. In a system of the foregoing type, the applicants have discovered that improved bilateral transmission of the digital data between the digital telephone line and the network can be achieved by using a unique combination of components, including a unique bus structure. Telephone control means responsive to the first telephone signal are used for generating a digital first telephone bus signal representing the first data. The control means also are responsive to the second telephone signal for generating a digital second telephone bus signal representing said second data.

Network control means responsive to said first network signal are used to generate a digital first network bus signal representing the third data. The network control means also are responsive to the second network signal for generating a digital second network bus signal representing the fourth data.

First modem means responsive to the telephone control means and the network control means modulate the first network bus signal to form a digital third telephone bus signal representing the third data. The first modem means also demodulate the first telephone bus signal to form a digital third network bus signal representing the first data.

Second modem means responsive to the telephone control means and the network control means modulate the second network bus signal to form a digital fourth telephone bus signal representing the fourth data. The second modem means also demodulate the second telephone bus signal to form a digital fourth network bus signal representing the second data.

Telephone bus means responsive to said telephone control means transmit the first and third telephone bus signals between the telephone control means and the first modem means. The telephone bus means also transmit the second and fourth telephone bus signals between the telephone control means and the second modem means.

Network parallel bus means responsive to said network control means transmit the first and third network bus signals between the network control means and the first modem means. The network parallel bus means also transmit the second and fourth network bus signals between the network control means and the second modem means.

By using the foregoing apparatus, the first and third computers bilaterally communicate while said second and fourth computers bilaterally communicate via the telephone line. The unique bus structure, in combination with the other components, enables computers connected to conventional analog and digital telephone lines to communicate with computers connected by a network with a degree of accuracy and economy unattainable by prior techniques.

According to another aspect of the invention, the third and fourth network bus signals are processed. By using this technique, call setup information included in the telephone signals can be used to select parameter signals representing demodulation standards. The demodulation of the telephone signals is executed according to the selected demodulation standard.

According to another aspect of the invention, apparatus is provided for enabling bilateral transmission of digital data between a digital telephone line carrying multiple data channels and a network. The apparatus includes a plurality of modems, as well as a circuit switched time division multiplex bus and a parallel bus. Telephone control means couple the data channels to the time division multiplex bus. Network control means couple the parallel bus to said network. By using such unique structure, the synchronization of information in the data channels can be maintained by the time division multiplex bus, and the bandwidth available on said parallel bus is available to each of said modems.

By using the foregoing techniques, computers linked by telephone lines and networks can communicate with a degree of control and speed unattainable by prior techniques.

BRIEF DESCRIPTION OF THE DRAWINGS

These and other objects, advantages and features of the invention will appear for purpose of illustration, but not of limitation, in connection with FIGS. 1–28, wherein like numbers refer to like parts throughout and in which:

FIGS. 9A–9C are schematic block diagrams of a preferred form of gateway card of the type shown in FIG. 3;

FIG. 9D is a schematic block diagram of a preferred form of token ring interface card of the type shown in FIG. 3;

FIG. 15 is a schematic diagram of a preferred form of command control block used by the programs illustrated in FIG. 14;

FIG. 16 is a schematic diagram of a preferred form of command block extension used by the programs illustrated in FIG. 14;

FIG. 20 is a schematic diagram of a preferred form of message type PH Connect_Ack used by the programs illustrated in FIG. 14;

FIG. 21 is a schematic diagram of a preferred form of message type PH Send_Req used by the programs illustrated in FIG. 14;

FIG. 22 is a schematic diagram of a preferred form of message type PH Send_Ack used by the programs illustrated in FIG. 14;

FIG. 23 is a schematic diagram of a preferred form of PAP message used by the programs illustrated in FIG. 14;

FIG. 24 is a flow diagram illustrating a preferred method of linking PAP fragments according to the programs illustrated in FIG. 14;

FIG. 25 is a schematic diagram of a preferred form of message type PH Receive_Req used by the programs illustrated in FIG. 14;

FIG. 26 is a schematic diagram of a preferred form of message type PH Data_Ind used by the programs illustrated in FIG. 14; and FIG. 27 is a schematic diagram of a preferred form of message type PH Receive_Ack used by the programs illustrated in FIG. 14.

DETAILED DESCRIPTION OF THE PREFERRED EMBODIMENT

Figure 1:
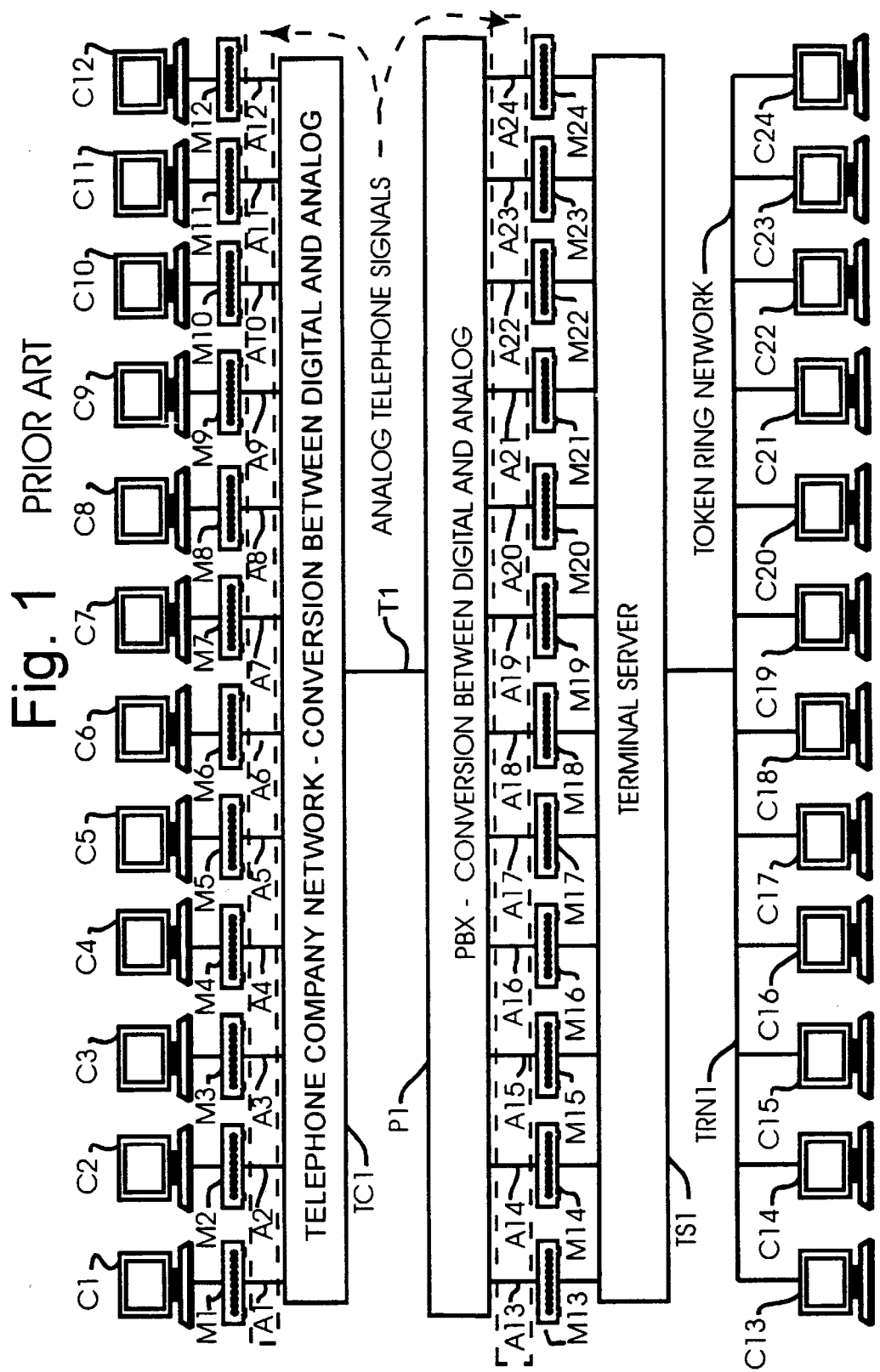
FIG. 1 is a schematic block diagram of a prior art network for enabling computers to communicate digital data over analog and digital telephone company lines and over a local area network.
Figure 2:
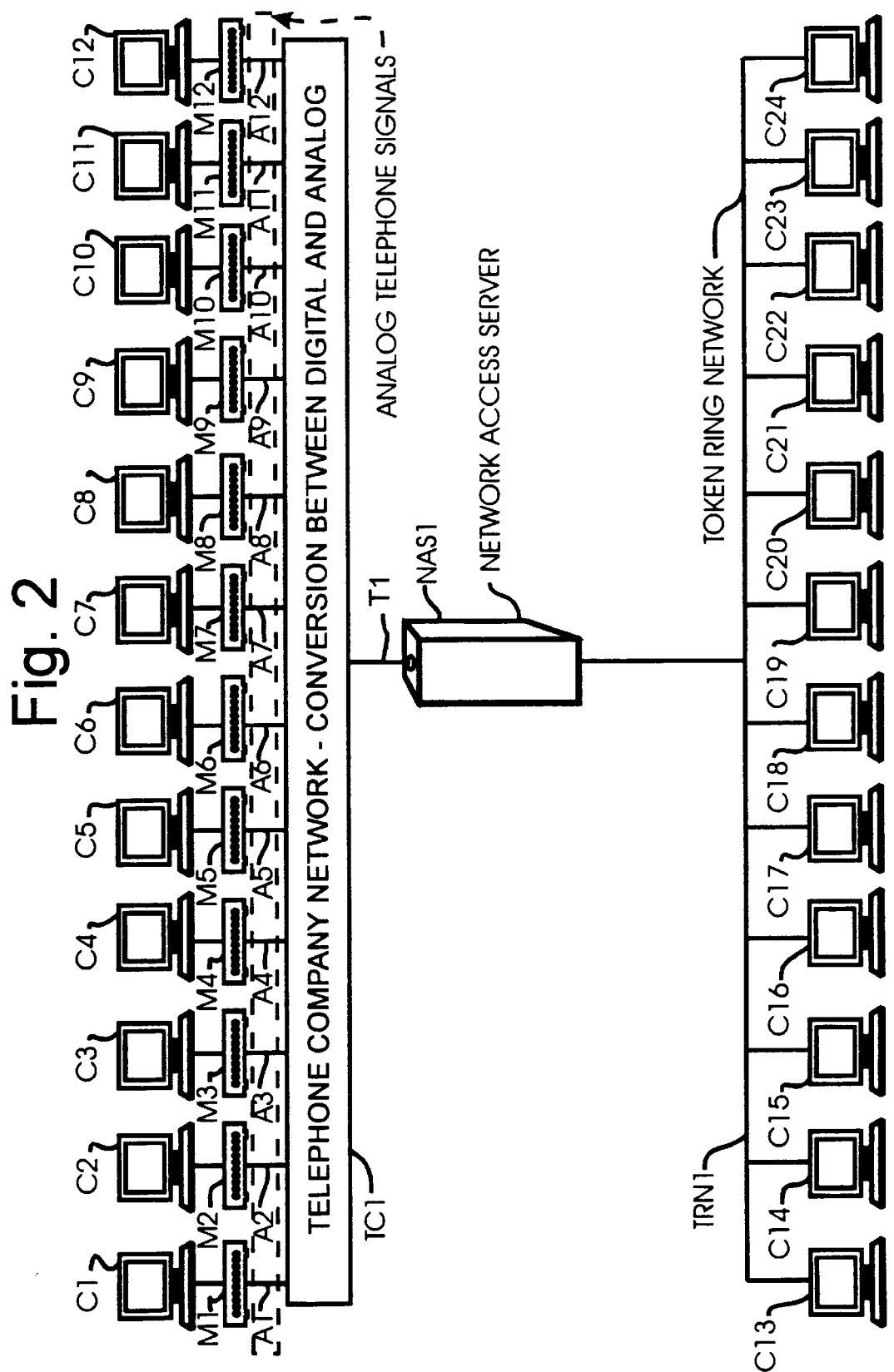
FIG. 2 is a block diagram of a preferred form of network access server made in accordance with the present invention enabling computers or terminals to communicate over telephone company networks, including both analog and digital telephone lines, as well as local computer networks.

Referring to FIG. 2, a preferred form of the present invention is shown as network access server NAS1. The invention may be used in connection with computers C1–C12, modems M1–M12, multiplexed telephone company line T1 and telephone company networks TC1 that were described in connection with FIG. 1. Computer C13 serves as a host computer that serves network TRN1.

Server NAS1 demodulates digital telephone signals on telephone line T1 into corresponding digital network data signals suitable for use by host computer C13 without converting the digital telephone signals to analog telephone signals. This feature results in substantial savings in equipment and modem costs. Due to the unique designs of the modems in server NAS1, there is no need to separate the digital multiplexed T1 telephone signals into individual analog telephone signals before demodulation. Conversely, server NAS1 modulates digital network data signals from computers C13–C24 into digital telephone signals suitable for transmission by telephone line T1 without converting the digital network data signals into analog telephone signals. Server NAS1 achieves the foregoing results while enabling full duplex communication between computers C1–C12 and computers C13–C24. This is a significant advantage that increases accuracy and reduces costs compared with the prior art system shown on FIG. 1.

Server NAS1 also employs a unique bus structure that enables rapid and accurate communication between telephone line T1 and computers C13–C24.

Computers C13–C24 are capable of communicating with computers C1–C12 over separate data channels. Network data signals are communicated between computers C13–24 and server NAS1 over a token ring network TRN1 that is served by host computer C13.

Figure 3:
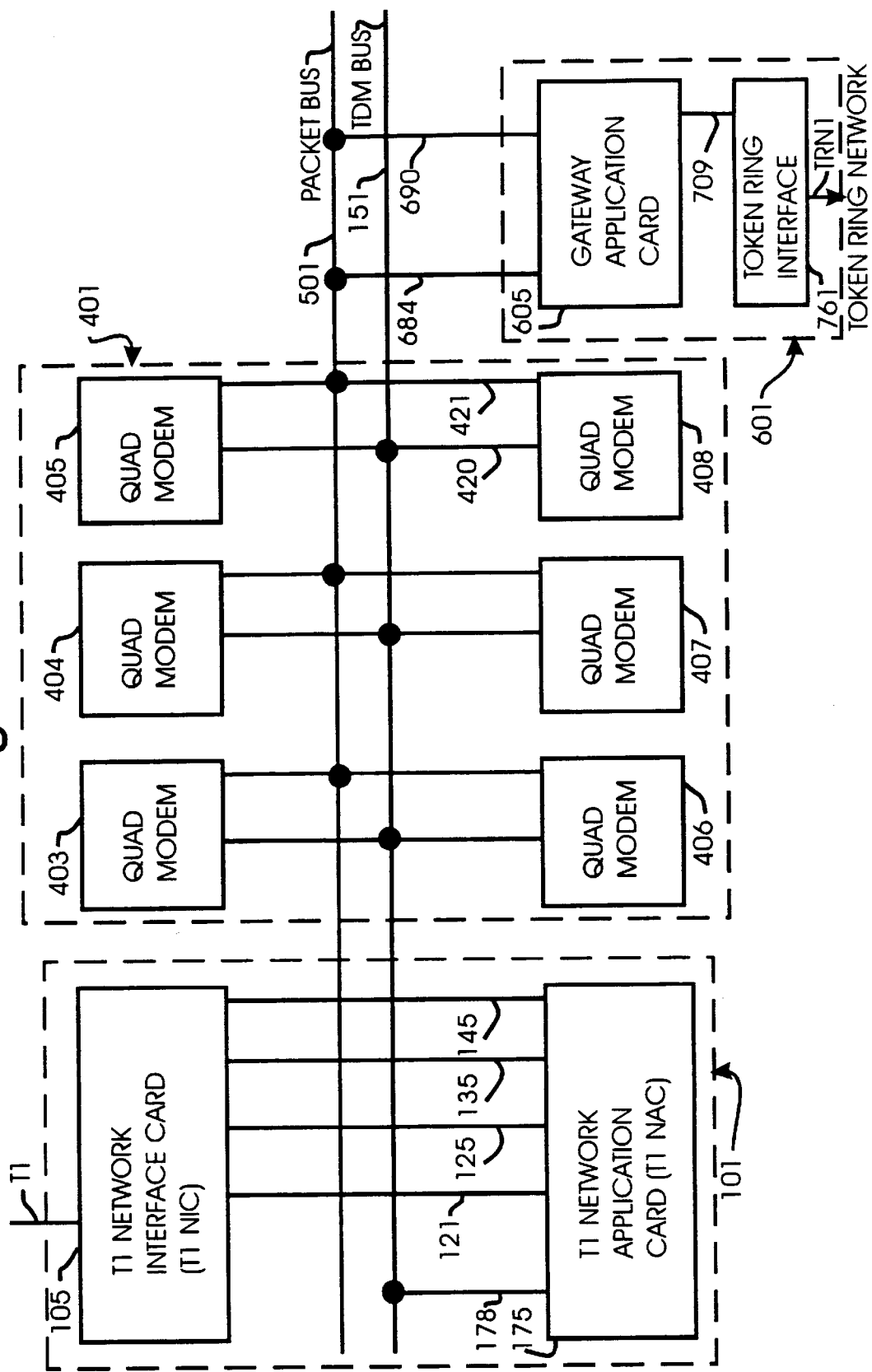
FIG. 3 is a schematic block diagram illustrating major modules of the network access server shown in FIG. 2.

Referring to FIG. 3, server NAS1 basically comprises a telephone control module 101, a TDM bus 151, a modem module 401, a packet bus 501 and a network control module 601. Telephone control module 101 comprises a T1 network interface card (T1 NAC) 105 and a T1 network application card (T1 NAC) 175. Modem module 401 comprises identical quad modem cards 403–408 connected to TDM bus 151 as shown. Network control module 601 comprises a gateway application card 605 and a token ring interface 761 connected as shown.

T1 NIC 105 has three primary functions:

(1) to provide the necessary interface for 1.544 MHz telephone span line T1;

(2) to process incoming calls from the telephone company service and connect those calls to modem module 401; and (3) to process outgoing calls from modem module 401 and connect those calls to telephone company service.

T1 NIC 105 provides a CSU interface which recovers clock signals and data from the incoming T1 signals, and also provides the transmission of digital telephone signals representing digital data to line T1. NIC 105 is connected to T1 NAC 175 via a backplane connector. T1 NAC 175 provides framing of recovered T1 data to extract the T1 DS0 channel data and then switches the channel data to quad modems 403–408.

Figure 4:
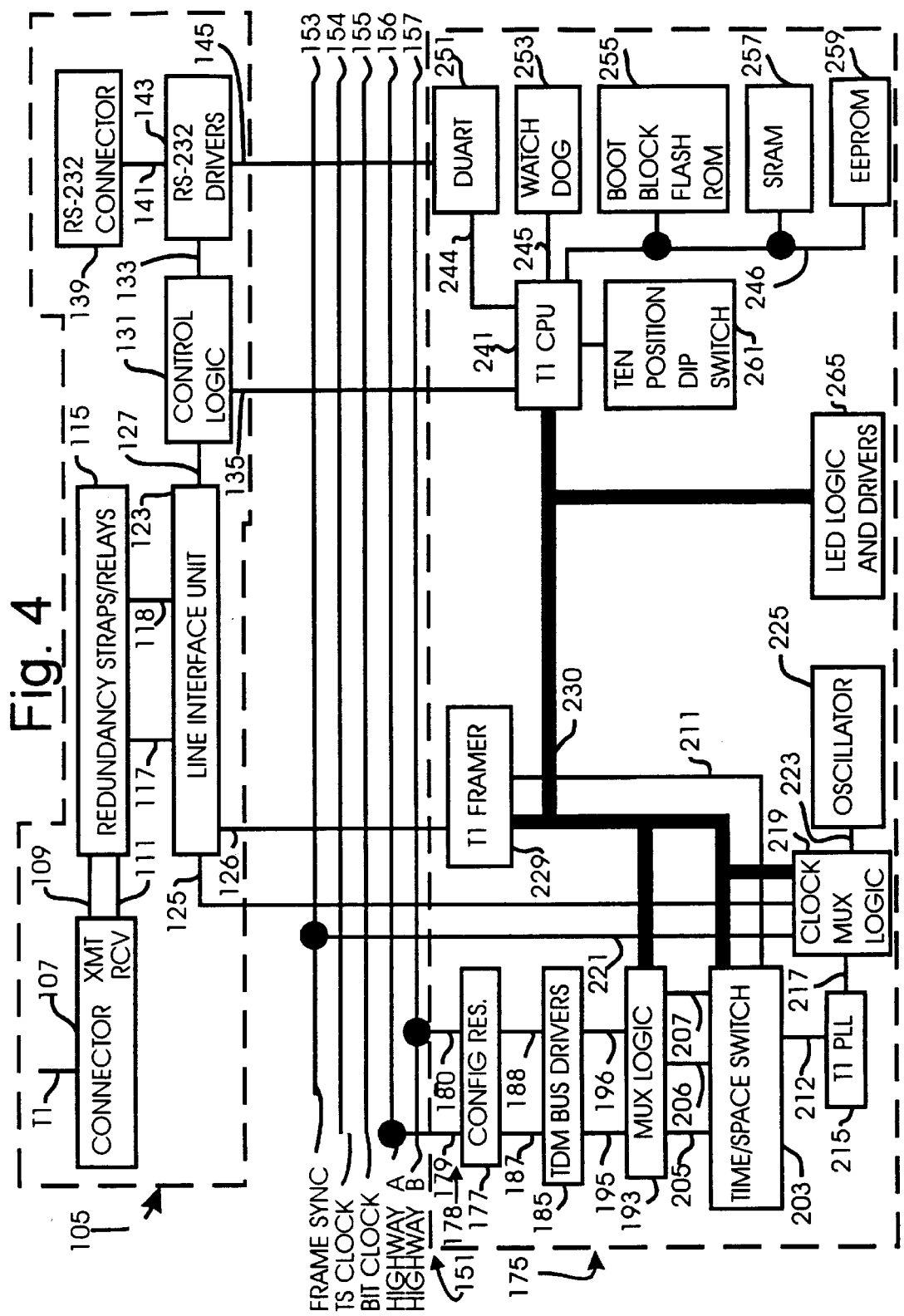
FIG. 4 is a schematic block diagram of a preferred form of T1 network interface card and T1 network application card of the type shown in FIG. 3.

Referring to FIG. 4, T1 NIC 105 comprises a connector 107 connected to telephone line T1 which carries 24 channels of digital telephone signals via time division multiplexing. Each of the channels is created by sampling an analog telephone signal 8,000 times per second using eight digital bits per sample.

Connector 107 transmits the T1 digital telephone signals over a conductor 109 and receives such signals over a conductor 111. Connector 107 includes modular 8 RJ48 connectors, 4 bantam jacks for monitoring each span's transmit (XMT) and receive (RCV) lines. Redundancy straps and relays 115 provide a redundancy capability and are used for switching the T1 signals to another T1 module like NIC 105, if present. The digital telephone signals are transmitted over conductors 117 and 118 to a line interface unit 123 which demultiplexes the signals and produces corresponding demultiplexed telephone output signals on a conductor 126 and clock signals on a conductor 125. For outgoing calls, interface unit 123 multiplexes digital telephone signals for transmission by line T1. Unit 123 is controlled by signals received over a conductor 127 from a control logic unit 131 which receives control signals over conductors 133 and 135. An RS-232 connector 139 can be connected to an external computer and monitor in order to receive local console signals that are passed through a conductor 141 to RS-232 drivers 143. The drivers also supply RS-232 signals over a conductor 145 to T1 NAC 175.

Still referring to FIG. 4, telephone control module 101 also includes a time division multiplex (TDM) bus 151 comprising a frame sync line 153, a time slot (TS) clock line 154, a bit clock line 155 and data highway lines 156–157.

The frame sync signal is used to identify the first time-slot in each TDM bus frame. The time slot signal represents the bit clock signal divided by 8. All modules use the TS clock signal to keep track of the current active time-slot. The bit clock signal is the internal TDM bus master clock. All modules accessing the TDM bus use the bit clock to control the transfer of data. The bit clock has a clock frequency of 4.096 MHz and is derived from one of the received line interfaces, from telephone network TC1, from some other bus master or from the internal oscillator.

TDM bus 151 operates with standard TTL voltage levels and supports a maximum clock frequency of 4.096 MHz. There exist 64 time-slots during each frame on the TDM bus. During a time-slot, a module will read one octet (8 bits) of data from one of the TDM bus highways, and write one octet of data to the other TDM bus highway. There is no need to distinguish one bus frame on the TDM bus from another bus frame on the TDM bus. There is however a need to distinguish between time-slots on the TDM bus. Therefore, each time-slot will be numbered 1–64. The TDM bus can consist of 4 bus highways, providing for 256 total time slots.

The TDM bus will provide 8 kilo bytes per second (Kbps) connections between as many as 64 end devices or modules. In order to provide 64 Kbps (full duplex) connections, each end device must be able to transmit and receive one octet (8 bits) every 125 microseconds (us). Therefore, the duration of each frame is 125 us. Since 64 time-slots exist per frame, the period of a time-slot is 1.95 us.

Figure 5:
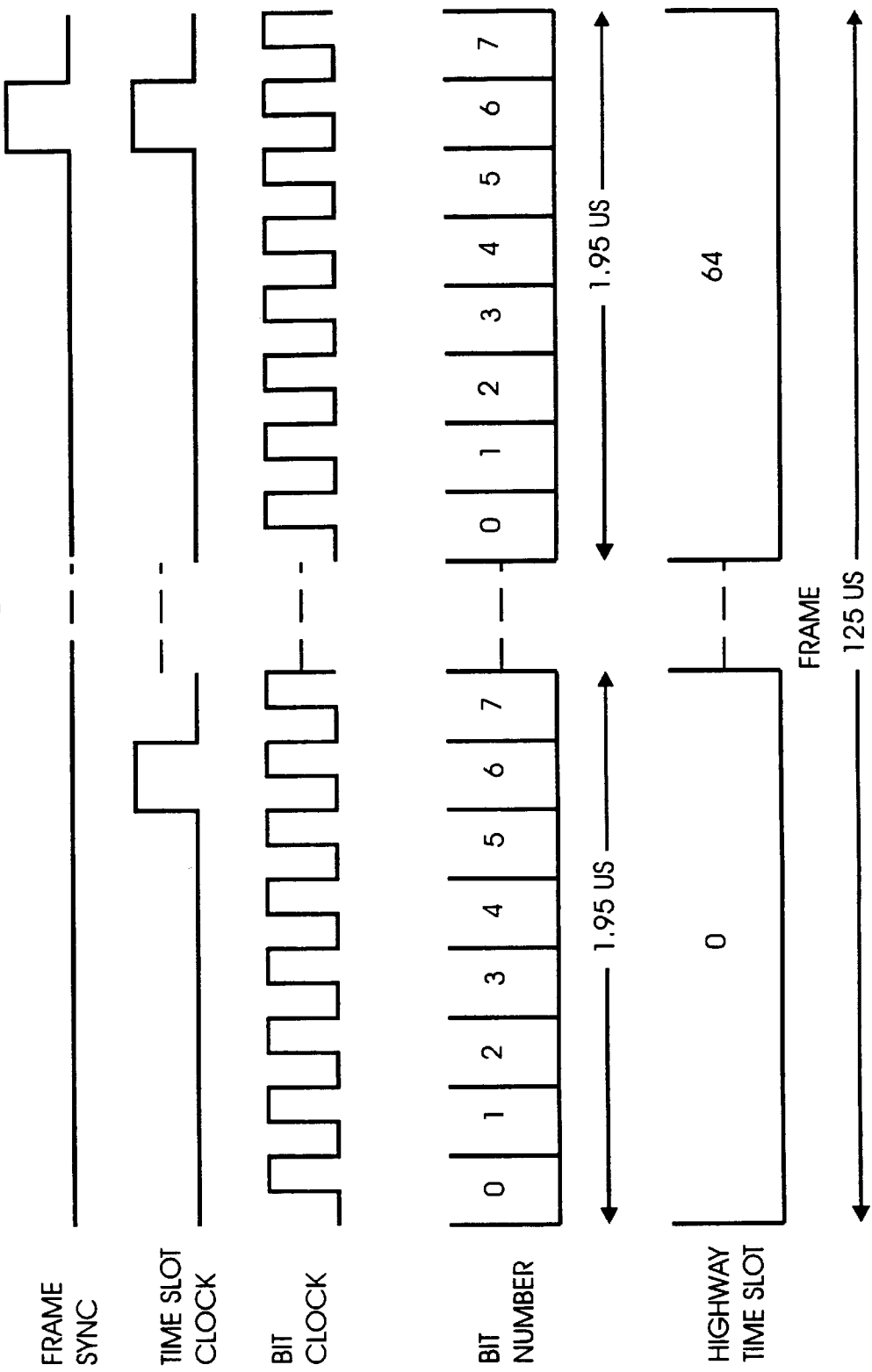
FIG. 5 is a timing diagram showing the relationship of signals appearing on the TDM bus illustrated in FIG. 3.

FIG. 5 shows the relationship between the duration of a TDM bus time-slot, the duration of a TDM bus bit time, the bit clock TS clock and frame sync signals. Each bit of a data octet will be driven onto the bus at the falling edge of the bit clock, and will be sampled by the receiving module at the rising edge of the bit clock.

As can be seen from FIG. 5, a new bit time begins on each falling edge of the bit clock, and a new time-slot begins on the falling edge of the next bit clock after a TS clock signal. The next bit clock after a frame sync signal identifies the beginning of the first time-slot of a TDM bus frame.

Figure 6:
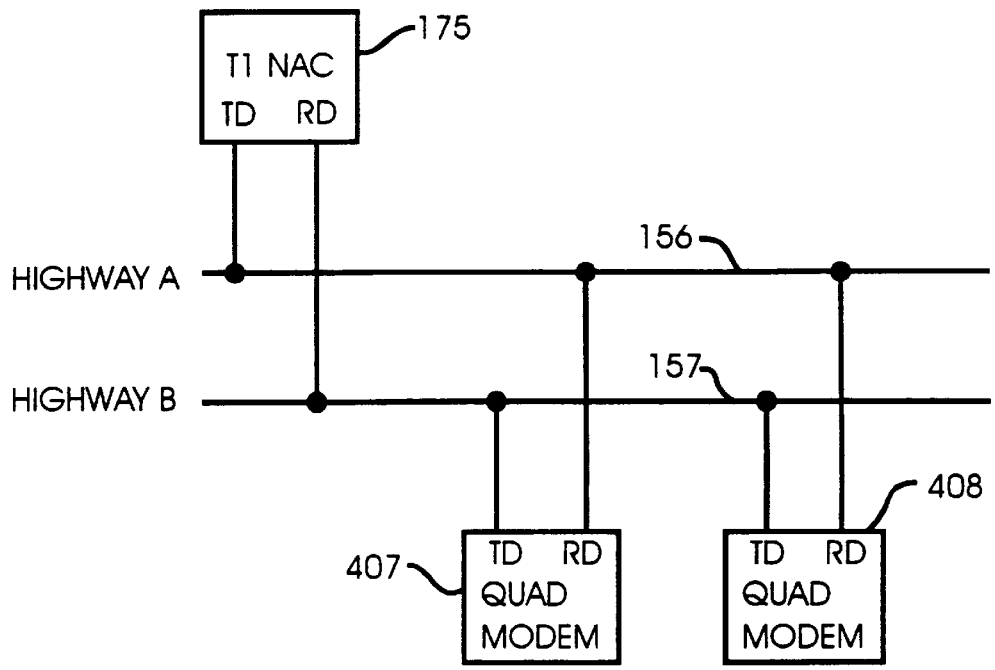
FIG. 6 is a schematic block diagram showing the connection to the TDM bus of the T1 NAC card and quad modems cards shown in FIG. 3.

As shown in FIG. 6, data is directly written from the transmit (TD) terminal of T1 NAC 175 to the receive terminal (RD) of one of the quad modems (e.g., 407 or 408) and vice versa.

T1 NAC 175 occupies rack slot 1 and assigns DS0 channels 1–24 from span line T1 to time-slots 1–24 on highways 156–157 of TDM bus 151. Quad modem cards 403–408 use the time-slots in groups of four and occupy the rack slots as defined in the following chart:

| Physical Slot Nos. | Time-Slot Nos. on TDM Bus | Card Type |
| --- | --- | --- |
| 1 | 1–48 | T1 NAC 175 |
| 2 | 1–4 | Quad modem card 403 |
| 3 | 5–8 | Quad modem card 404 |
| 4 | 9–12 | Quad modem card 405 |
| 5 | 13–16 | Quad modem card 406 |
| 6 | 17–20 | Quad modem card 407 |
| 7 | 21–24 | Quad modem card 408 |

Referring to FIG. 4, T1 network application card (T1 NAC) 175 includes configuration resistors 177 that are connected as shown over a bus 178 comprising conductors 179–180 to TDM bus 151. Configuration resistors 177 receive drive signals from TDM bus drivers 185 over conductors 187–188. The bus drivers, in turn, receive signals from multiplex logic circuit 193 over conductors 195–196. Logic circuit 193 is controlled by a time/space switch 203 over conductors 205–207. Switch 203 receives a control input over a conductor 212 from a T1 phase lock loop (PLL) circuit 215 that receives input over a conductor 217 from a clock multiplex logic circuit 219. Logic circuit 219, in turn, receives 4.096 MHz clock signals generated by an oscillator 225 over a conductor 223 and receives the frame sync signal over a conductor 221. A T1 framer unit 229 frames telephone signals from line interface unit 123 and makes the resulting data frames available to an 8 bit data bus 230. Framer 229 receives control signals from time/space switch 203 over a conductor 211.

T1 NAC 175 is controlled by a T1 central processing unit (CPU) 241 that controls bus 230 and controls logic circuit 131 over conductor 135. T1 CPU 241 also receives input signals over conductors 244–246 from a dual universal asynchronous receiver transmitter (DUART) 251, a watchdog timer 253, a boot block flash ROM 255, an SRAM memory 257 and a EEPROM memory 259. T1 CPU 241 also receives inputs from a ten position DIP switch 261. The status of T1 NAC 175 is displayed on light emitting diodes (LEDs) that are controlled by an LED logic and drivers unit 265.

T1 CPU 241 uses an Intel 80C186 embedded processor to control all peripherals on T1 NAC 175 and T1 NIC 105, including framer 229, time/space switch 203, multiplex logic circuit 193, clock multiplex logic unit 219, bus 230 and LED logic and drivers unit 265. RS-232 connector 139, drivers 143 and DUART 251 provide an operator with the ability to manage T1 NAC 175. T1 CPU 241 initializes all hardware with default values, settings and configurations. These defaults are stored in flash ROM memory 255 and can be altered via a conventional software download.

The memory for T1 NAC 175 consists of 512K of boot block flash ROM 255 and 512K of SRAM 257. EEPROM memory 259 is expandable from 8K to 65K. Boot blocked flash ROM 255 has the ability to update the operational code without jeopardizing the BOOT code during a software download. This is an important feature since T1 NAC 175 is guaranteed operable code to execute if operation code is lost during software download.

T1 framer 229 is dedicated to the incoming telephone span line T1 and handles all of the T1 receive framing and transmit framing tasks. T1 CPU 241 accesses and controls framer 229 via bus 230. Framer 229 operates in the SF framing mode, and is capable of supporting all framing modes, signaling, line coding and performance monitoring required for interfacing to line T1. The outputs of framer 229 are concentrated highway interface (CHI) compatible which is an AT&T standard. The CHI outputs of framer 229 are wire OR'ed together to time/space switch 203 which switches the T1 DSO channels to the TDM bus 151 timeslots. Framer 229 receives span line T1 recovered data and clock from line interface unit 123.

The A and B signaling information from the telephone company is decoded by framer 229. T1 CPU 241 polls the framer's internal registers to extract the received A and B signaling states. T1 CPU 241 programs outbound A and B signaling states for framer 229.

Time/space switch 203 controls which DSO channel is to fill a given time-slot on TDM bus 151. The switching capability of time/space switch 203 allows connection between any of the 24 time-slots from T1 framer 229 and the 64 time-slots on the TDM bus. Time/space switch 203 has a microprocessor interface via bus 203 which provides T1 CPU 241 with access to internal configuration registers and time-slot data. Time/space switch 203 has four CHI buses (TTL compatible) which can be controlled independently. Switch 203 also can be programmed for frame integrity for wide area network (WAN) compatibility. Frame integrity means that all the time-slots in the output frame came from the same input frame, even if the time-slots were on different CHI highways. This allows equal delay of all time-slots through the time/space switch. Thus, time-slots data can be contiguous.

Time/space switch 203 uses the TDM bus 151 clock signals to pass data between the TDM bus time-slots and T1 framer 229. The internal connection memory of time/space switch 203 is programmed by T1 CPU 241 with the proper connections. Time/space switch 203 allows T1 CPU 241 access to each of the 24 DSO channels. T1 CPU 241 monitors the DSO data being transmitted to modem module 401 or data being received from modem module 401. T1 CPU 241 also can program time/space switch 203 to replace the DSO data being transmitted to modem module 401 or framer 229 with any desired 8-bit pattern. T1 NAC 175 uses this feature for in-band communications with modem module 401. The programmability of DSO channel data via time/space switch 203 allows T1 NAC 175 to connect the telephone company trunk with modem time-slot data or disconnect the two sides completely. T1 CPU 241 uses this feature to isolate the in-band signaling between modem module 401 and T1 NAC 175 from the telephone company.

Multiplex logic circuit 193 is controlled by T1 CPU 241 and is used to connect any one of the CHI highways from time/space switch 203 to TDM bus highways 156–157. TDM bus drivers 185 consist of 4 bi-directional TTL bus drivers. Configuration resistors 177 have been added to T1 NAC 175 to allow configuration of the transmit and receive highways 156–157. These resistors will allow T1 NAC 175 to talk to another NAC without the use of a network management system.

T1 NIC 105 provides the line interface circuitry between the T1 trunk and T1 framer 229. Line interface unit 123 provides an interface for span line T1. Unit 123 contains automatic gain control (AGC), auto-equalization, and data/clock recovery and recovers the T1 1.544 MHz network clock which is used by T1 NAC 175 to clock data to T1 framer 229 and, depending on configuration, may be used by T1 NAC 175 as a timing source.

Connector 139 and drivers 143 form an RS-232 serial interface which is used for basic T1 NAC 175 management functions and software download via DUART 251. T1 NIC 105 is managed completely by NAC 175.

Figure 7:
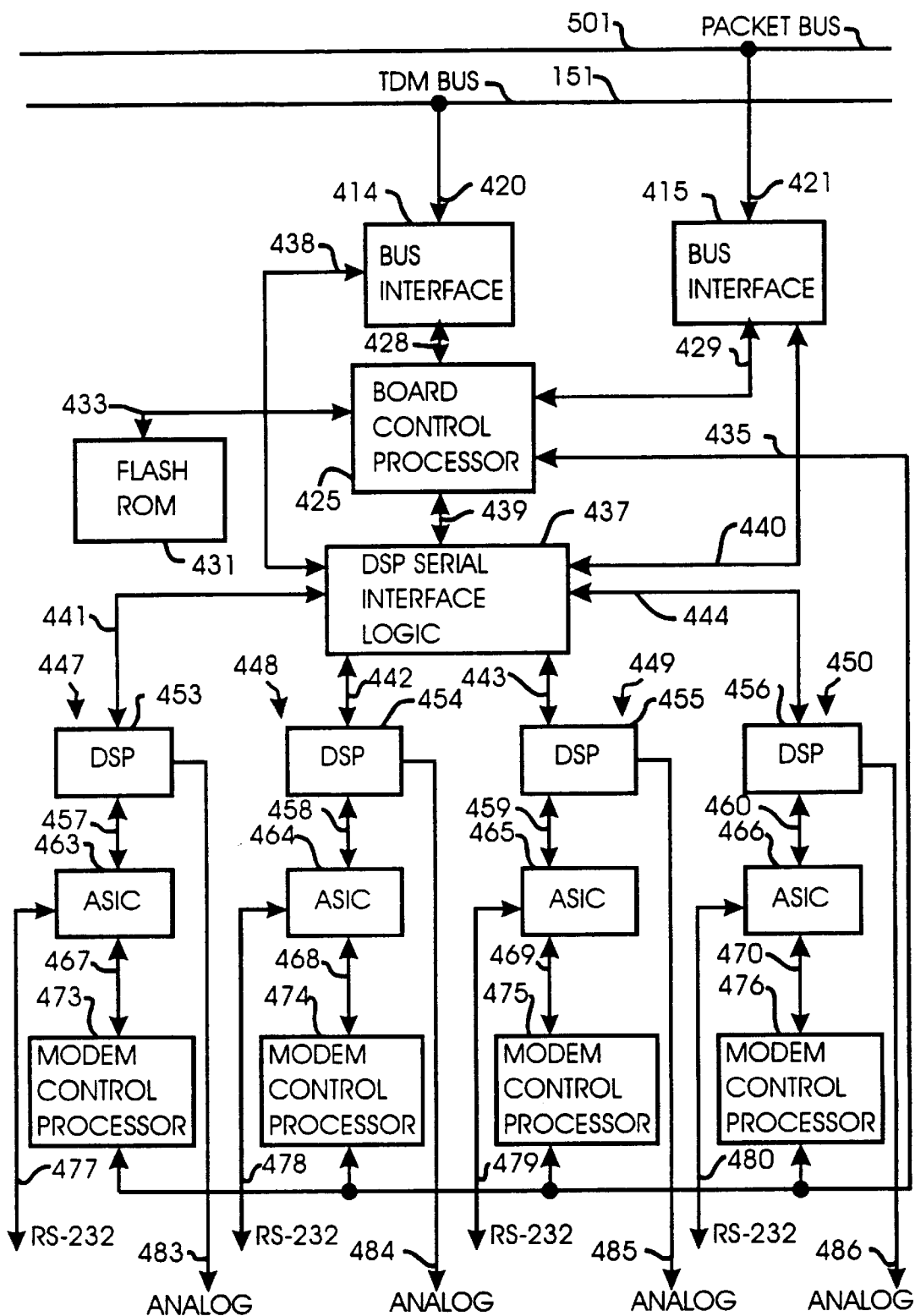
FIG. 7 is a schematic block diagram of a preferred form of quad modem card of the type shown in FIG. 3.

FIG. 7 illustrates quad modem card 408 which is identical to quad modem cards 403–407. Each of cards 403–408 contains four modems for a total of 24 modems. As a result, server NAS1 can handle a total of 24 simultaneous full duplex channels of data communication.

Card 408 comprises a bus interface unit 414 that communicates with TDM bus 151 through an output bus 420 and a bus interface unit 415 that communicates with packet bus 501 through an output bus 421. A board control processor 425 communicates over buses 428, 429, 433 and 435. Bus 429 transmits control signals as well as some data. A flash ROM 431 provides memory for processor 425.

Digital signal processor serial interface logic 437 communicates with processor 425 over a bus 439 and communicates with individual modems 447–450 over buses 441–444, respectively. Data is transmitted between interface logic 437 and bus interfaces 414 and 415 over busses 438 and 440, respectively. Each of modems 447–450 is identical. The modems comprise digital signal processors 453–456, application specific integrated circuits (ASICs) 463–466 and modem control processors 473–476 connected as shown over buses 457–460 and 467–470. Processors 473–476 communicate with processor 425 over bus 435. ASICs 463–466 provide RS-233 ports 477–480. These ports, together with the comparable ports from quad modem units 403–407, form a coupling circuit enabling the modem units to communicate with a processors not connected to network TRN1 (FIG. 2). DSPs 453–456 provide analog outputs 483–486, respectively. The analog outputs can be connected to analog modems that communicate with computers not connected to network TRN1.

The hardware for each of modems 447–450 is identical to the hardware found in modem model USR Courier Dual Standard manufactured by U.S. Robotics, Inc., Skokie, Ill. Each modem will support the following modulation standards: V.32bis, V.32, V.22bis, V.22, Bell 212, Bell 103 and Bell 208B, and the following error correction and data compression protocols: V.42, V.42bis and MNP2-5.

Board control processor 425 controls the reception and transmission of signals between modems 447–450 and packet bus 501, controls the code set for quad modem card 408, and distributes code to quad modem 408 during a software download.

Interface logic 437 handles the interfacing of modems 447–450 to TDM bus 151, including counting of time slots on TDM bus 151 and the multiplexing and demultiplexing of signals transmitted between modems 447–450 and TDM bus 151.

The circuits shown in FIGS. 4 and 7 are available commercially as indicated in the following table:

| Circuits | Manufacturer & Model Number |
| --- | --- |
| Line interface unit 123 | Level One LT 310 |
| Control logic 131 | AMD PAL 22V10 |
| T1 framer 229 | AT&T T7230 |
| DUART 251 | Signetics SCC2.692 |
| TDM bus drivers 185 | Texas Instruments 74F126 |
| T1 CPU 241 | Intel 80C186 |
| Watch dog 253 | Maxim 697 |
| MUX logic 193 | AMD 22V10 |
| Boot block flash ROM 255 | Intel 28F001 |
| Time/space switch 203 | AT&T T7270 |
| SRAM 257 | Hitachi HM 628128 |
| T1 PLL 215 | SG ULLA VXO |
| Clock MUX logic 219 | AMD PAL 16V8 |
| Oscillator 225 | Pletronics 32 MHz |
| LED logic and drivers 265 | Texas Instruments 74ALS573 |
| EEPROM 259 | Atmel AT28HC64 |
| Bus interface 414 | XILINX 3064 |
| Board control processor 425 | Intel 80C188 |
| Flash ROM 431 | Intel 28F020 |
| DSP serial interface logic 437 | XILINX 3064 |
| DSPs 453–456 | Texas Instruments 3LOC52 |
| ASICs 463–466 | U.S. Robotics 1.016.684 |
| Modem control processors 473–476 | Intel 80C188 |

The operation of modems 447–450 is coordinated by the clock and sync signals shown in FIG. 5. For example, referring to modem 447 (FIG. 7), on the trailing edge of the next bit clock following detection of the frame sync signal (FIG. 5), the assigned time slot number of modem 447 is loaded from a latch in ASIC 463 (FIG. 7) to a set of counters. A time slot counter counts the number of time slot clock pulses relative to the frame sync signal. When the counter reaches terminal count, the serial I/O (via tri-stateable buffers) of DSP 453 is switched to the TDM bus highway lines 156–157. One octet of data is then transmitted or received within that slot time (1.95 microseconds (us)). The bus is then released. Synchronization for data transfer is done via the TDM bit clock and a bit clock counter.

Processing of data by DSP 453 (filtering, demodulation, detection, etc.) is similar to that done when data transfer took place via an AIC. However, the 4.096 MHz bit rate must be accommodated. The synchronous serial port on the DSP can operate at one fourth the machine clock rate of 20.48 MHz or 5.12 MHz. Hence the 4.096 MHz data does not pose a problem.

Figure 8:
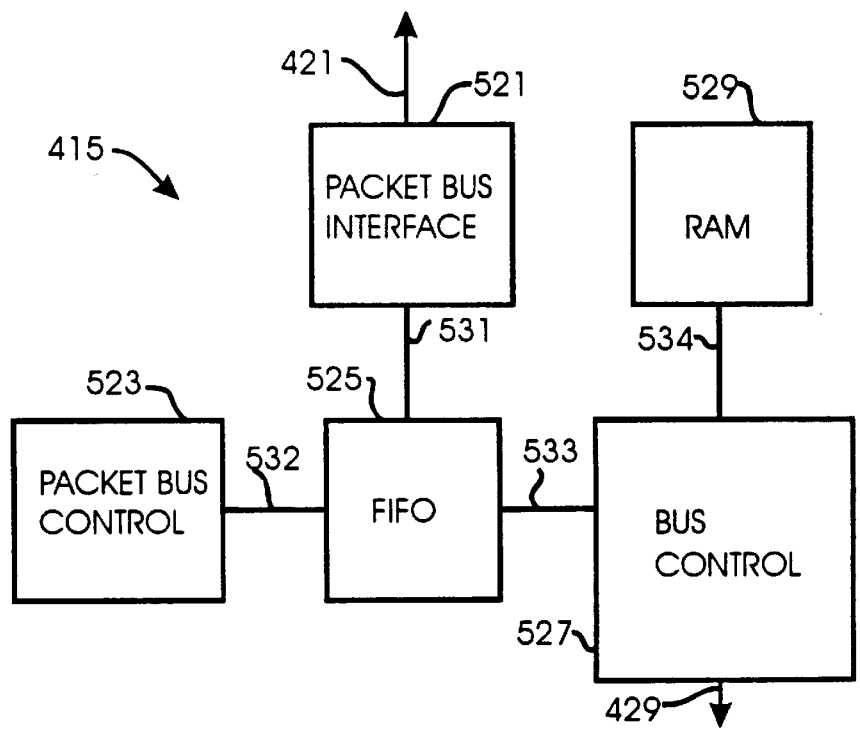
FIG. 8 is a schematic block diagram of a preferred form of interface for the quad modem card shown in FIG. 7.

Referring to FIG. 8, bus interface 415 (FIG. 7) comprises a packet bus interface 521, a packet bus control circuit 523, a FIFO memory 525, a bus control circuit 527, and a random access memory (RAM) 529 that are connected as shown by buses 531–534.

The circuits shown in FIG. 8 are available commercially as indicated in the following table:

| Circuits | Manufacturer & Model Number |
| --- | --- |
| Packet bus interface 521 | Texas Instruments NuBus Chip Set SN 74 BCT 2420 and SN 74 ACT 2440 |
| Packet bus control circuit 523 | Xilinx 3064 |
| FIFO memory 525 | Texas Instruments 74 ABT 7820 |
| Bus control circuit 527 | PLDs 22V10, 26V12 and 16V8 |

Figure 9A:
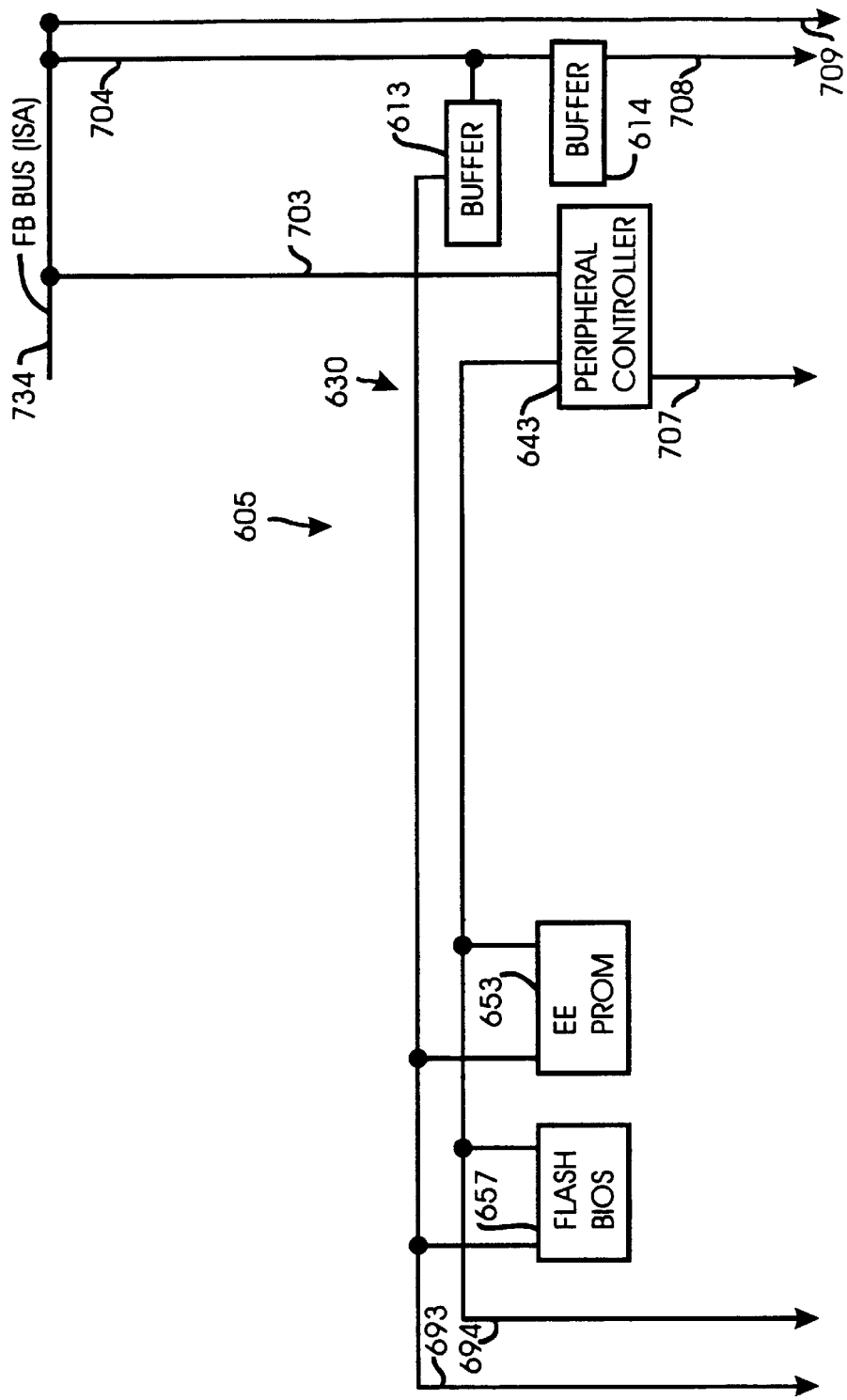

Referring to FIGS. 9A–9C, gateway application card 605 comprises network management interface 608, control engine circuits 630, a packet bus control engine 735, and a direct memory access (DMA) engine 742.

Referring to FIG. 9A, interface 608 comprises a debug port 612, a 3 pin header 614 that is connected to port 612 by a bus 615, an ISA interface 616, network management bus (NMB) interface 618, and a bus 620 that connects interface 618 with network management bus 901. Interface 616 is connected to data bus 693 and address bus 694 as shown. Interface 608 is a Signetics 2692 DUART. Half of the DUART is used as debug port 612.

Referring to FIGS. 9A and 9B, control engine circuits 630 include a central processing unit (CPU) 633, a memory controller 635 (Chips & Technology 82C351), a DRAM memory 637, a data buffer 641 (Chips & Technology 82C355), a peripheral controller 643 (Chips & Technology 82C356), a debug port 645, an EEPROM 653, a flash SIMM interface 655, a flash BIOS 657, an LED display 659, a three pin header 669, and a switch selector 677. The components are connected as shown by busses 693, 694, 703, 704, 707–709, 721 and 729, and by an ISA bus 734.

Referring to FIG. 9C, packet bus engine 735 comprises a NuBus driver 736 for upper address bits 0–15 and a NuBus driver 737 for lower address bits 16–31. A receive FIFO 16 bit register 738 and a transmit FIFO 16 bit register 739 enable the receipt and transmission of information on packet bus 501. Engine 735 also includes a NuBus control circuit 740 that is operated by a Xilinx controller 741.

Still referring to FIG. 9C, DMA engine 742 comprises a frame flag circuit 743, a read FIFO programmable array logic (PAL) 744, a write FIFO PAL 745, a timing PAL 746, a DMA control circuit 747, a channel control PAL 748, a block count latch 749, a CPU address buffer 750, a CPU data buffer 751, a DMA control register 752, and a dual port RAM 753.

The circuits in engines 735 and 742 are connected as shown by busses 755A–755S.

Bus 755C is an 18 bit bus; bus 755F is a 17 bit bus; bus 755L is an 8 bit address bus; bus 755M is a 16 bit bus; bus 755S is an 8 bit bus; bus 694 is an 8 bit address bus; bus 693 is a 16 bit data bus; bus 755N is a 4 bit bus; bus 755O is a 4 bit bus; and bus 755Q is a 6 bit bus.

Referring to FIG. 9D, token ring interface 761 (FIG. 2) comprises a ring interface 763, a ring buffer 765, a token ring controller 767, an RS-232 interface 769 and an AT buffer 771. The components are connected together as shown by busses 775 and 777–780.

CPU 633 (FIG. 9B) is an 80386DX running at 33 MHz. All CPU instructions are located in DRAM 637. The CPU footprint supports either the Intel 132-pin PQFP or the Advanced Micro Devices (AMD) version of the same processor.

Processor 633 has a watchdog function to detect possible hardware or software errors. The watchdog timer will initially power up disabled and can be software enabled.

This is to allow BIOS 657 to initialize the system without interruption. After the watch dog timer is enabled, the time out period is 1.6 sec. for all applications. The software application is responsible for these enables. The timer will be responsible for (1) uniform reset state after power up; (2) NMI (non-maskable interrupt) when the first timer interrupt occurs; and (3) reset when the second consecutive timer interrupt occurs.

Memory controller 635 (FIG. 9B) provides the DRAM to CPU 633. Controller 635 controls all bus accesses including CPU 633, DRAM 637 and ISA bus 734. Timing parameters for DRAM 637 accesses and refresh are controlled by controller 635. The main chip in controller 635 is a 82C351 CPU/DRAM controller, a 160 pin PQFP. The following parameters are controlled from controller 635: reset and shutdown logic; bus 734 and CPU clock selection logic; control logic for CPU 633, DRAM 637, bus 734 access, bus arbitration, and 0 or 1 wait-state buffered write; memory control logic for DRAM access, refresh cycle, flash BIOS access and shadow RAM support; index registers for system control; fast reset; and fast gate A20.

DRAM 637 includes two SIMM banks of DRAM. Each bank can support the following DRAM modules: 256KX36 DRAM module—1 MB per bank; 1MegX36 DRAM module—4 MB per bank; and 4MegX36 DRAM module—16 MB per bank.

Data buffer 641 provides all the logic required to interface memory data bus 708 to local bus 729. The main chip in buffer 641 is an 83C355, a 120 pin PQFP. Buffer 641 buffers data between busses 708 and 729; generates and checks parity for DRAM 637; latches data for DRAM buffered writes; latches data from bus 734 during reads of CPU 633 from bus 734; performs data steering for accesses to bus 734; and provides paths for busses 704 and 693.

Peripheral controller 643 (FIG. 9A) controls all the peripheral devices on ISA bus 734. It contains the address buffers used to interface local address bus 707 to I/O channel address bus 694. The main chip in controller 643 is an 83C356, a 144-pin PQFP. It contains all the necessary peripheral control devices for basic ISA bus interconnection to ISA bus 734: DMA controllers (8237); interrupt controllers (8259);

a timer/counter (8254); and an RTC (real time clock) with CMOS RAM+battery SRAM (MC14618).

Debug port 618 is a debug UART port. It is used to connect a debug terminal for software debugging. It is controlled by a 2692 DUART. This chip is interfaced to local bus 734 via data buffer 613 through bus 704.

Keyboard interface 651 (FIG. 9B) uses the Intel UPIC42 with a chip and technology keyboard algorithm mask on board. This part is a 44-pin PLCC. This part emulates the 8042 chips and technology keyboard interface and is interfaced via data buffer 613 through bus 704.

Electrically erasable PROM 653 (FIG. 9A) is an 8KX8 EEPROM which stores board information, such as serial number and all configuration data to run and initialize application programs. This device has the ability to be software write-protected. Once enabled, the device can be automatically protected during power-up and power-down without the need for external circuitry. The 8KX8 EEPROM is interfaced via data buffer 613 through bus 704. Accesses to this device are through a paging interface whereby 2K pages are accessed via a pre-loaded page register. The chip is a 32-pin PLCC.

Flash SIMM Interface 655 (FIG. 9B) supports up to 8 1MegX8 symmetrically blocked flash memories. The flash SIMM interfaces to processor 633 via local bus 729. All operating system and application code are stored in the flash SIMM.

BIOS ROM 657 (FIG. 9A) stores a ROM-based code common to all IBM PCs and is executed at power-up or reset just after RAM refresh is started and a program stack is created. BIOS provides power-on diagnostics and low-level driver support and executes the operating system at the end of the power-on sequence. The BIOS resides in a flash ROM and is executed out of the 64 Kbyte area located at the top of the 4 Gbyte address space. After the PC engine has been fully initialized and tested, the extended BIOS initializes all specific devices on card 605 and loads operational software from the flash SIMM to DRAM 637. Once all initialization and testing is complete, BIOS can be shadowed down to a 128 Kbyte address area located in the first Mbyte of memory.

LED display 659 (FIG. 9B) contains the LEDs on card 605. All LEDs can be controlled by software via a 16-bit register. All LEDs are interfaced from ISA bus 734 via data buffer 613 through bus 693.

Referring to FIG. 9C, NuBus upper and lower buffers 736 and 737 are responsible for buffering both the 32 bit NuBus address and data busses 755A and 755B to and from packet bus engine 735.

NuBus control 740 is responsible for handling all the interface control signals to and from packet bus 501. Control 740 is monitored and controlled by the state machines of Xilinx controller 741.

Receive FIFO 738 represents 512×18 bits of FIFO memory used to buffer data from NuBus data buffers 736 and 737 to dual port RAM 753. FIFO 738 is controlled by Read FIFO PAL 744. FIFO 738 also can be reset via program control.

Transmit FIFO 739 represents 512×18 bits of FIFO memory used to buffer data from the dual port RAM 753 to NuBus data buffers 736 and 739. FIFO 739 is controlled by write FIFO PAL 745. FIFO 739 also can be reset via program control.

Xilinx controller 741 represents a xilinx FPGA used to control, through state machines, the movement of data to and from FIFOs 738 and 739, and to and from NuBus buffers 736 and 737. Controller 741 has internal control and status registers, and can be programmed from the CPU interface.

DMA controller 747 represents the 20 Mhz 82C257 DMA controller. It is responsible for creating the address and handshake signals needed to move data to and from the dual port RAM 753 and to and from FIFOs 738 and 739. Control 747 contains internal control registers and status registers.

Read FIFO PAL 744 generates, through the use of timing queues from timing PAL 746, DMA control 747 and Xilinx controller 741, the necessary signals to unload the read data from receive FIFO 738 and present the data on bus 755F to dual port RAM 753.

Write FIFO PAL 745 generates, through the use of timing queues from timing PAL 746, DMA controller 747 and Xilinx controller 741, the necessary signals to load the write data from dual port RAM 753 to transmit FIFO 739.

Timing PAL 746, through status and start queues generated from program control and the FIFO full and empty lines, generates seven timing cycles which are divided across the DMA cycle to control the movement of data and the correct execution of control signals.

Channel control PAL 748, through the use of control information from program control and from block count latch 749, routes request and end of DMA information to their appropriate places.

Frame flag 743 is a bit register, loaded into the FIFO by Xilinx controller 741 at the end of a block, that is used to queue the hardware when the block count information for the next transfer is present, at which time the logic will read that information out, and write it to the block count latch. Flag 743 can be written to via program control.

Block count latch 749 represents a latch which stores the block count information for the next block transfer. Latch 749 is loaded from read FIFO PAL 744.

CPU address buffer 750 represents the buffers used by CPU peripheral bus 694 to access the DMA controllers address bus 755K to load or read control information.

CPU data buffer 751 represents the bi-directional buffers used by CPU peripheral bus 693 to access the DMA controllers data bus 755M for loading and unloading of control and status information.

DMA control register 752 represents the control register used to queue start up processes for the DMA logic. The DMA can be turned off and turned on via processor control through register 752 both on the transmit side and on the receive side.

Dual port RAM 753 stores data for packets and blocks and channel control programs for the DMA. RAM 753 is accessed from port 1 by the CPU, and from port 2 by the DMA control logic. RAM 753 is made up of 256 k bytes of static RAM under the control of a dual port arbiter.

Referring to FIG. 9D, ring interface 763 contains the digital interface to the digital portion of the token ring control and buffer logic and the analog interface to the token ring medium to make a full duplex electric interface as per IEEE Std 802.5-1989. Interface 763 consists of a TMS38054 ring interface device and associated analog circuitry to handle clock and data recovery at both 4 and 16 Mbps, using either shielded or unshielded twisted pair connection. The chip is a 44-pin PLCC.

Ring buffer 765 carries four 256KX4-100 DRAMS used to hold the ring data. This DRAM array is used to buffer the token ring frame when it comes in from the token ring network TRN1. It also holds all the MAC and LLC software that runs the TMS380 controller in controller 767. The DRAM in buffer 765 is controlled by controller 767. The software and data contained in the DRAM is executed by controller 767.

Token ring controller 767 is made up of the TMS38C16 token ring commprocessor. It is a complete IBM token ring, IEEE 802.5-1989 compatible chip capable of running at both 4 and 16 Mbps data rates. It also handles all the data transfers to and from the ring buffer and to and from the ring interface (FIG. 9D). The chip is a 132-pin PQFP.

RS-232 interface 769 provides an interface to the outside world to communicate with the application software running on card 605. The interface connection is via a RJ45 female port. It is made using a 16C550 UART. This chip interfaces to ISA bus 734 via bus 709. The baud rate of the interface is selected via selector switch 677 (FIG. 9B).

The operation by which server NAS1 processes incoming calls and outgoing calls will be described in connection with FIGS. 10 and 11 and in connection with the following terms:

Span line T1 refers to twenty-four 64 kilo bits per second DSO channels on line T1 that are multiplexed into the 1.544 mega bytes per second DS1 rate, with each DSO channel carrying the digital telephone signal representation of an analog voice channel.

A trunk is a communications channel between two switching systems. In the context of this specification, the term "trunk" will refer to a single DSO channel. A trunk group will refer to multiple DSO channels.

A seizure is an off-hook signal transmitted on a previously idle trunk. Detection by T1 NAC 105 of a seizure will indicate an incoming call.

There are two types of wink signals: off-hook winks and on-hook winks. This specification will refer to an off-hook wink type only. An off-hook wink signal is the transition to the off-hook state from an on-hook state, then back to an on-hook state after a short period of time. T1 NAC 175 uses the wink signal as a response to a trunk seizure.

MF tones are made up of six frequencies that provide 15 two-frequency combinations for indicating digits 0–9 and KP/ST signals. In the feature group B (FGB) service, these tones will represent the called number (DNIS) and the calling number (ANI) information.

An answer is an off-hook signal from the called equipment and indicates that the call has been properly answered. This is the time at which telephone company billing begins. T1 NAC 175 is responsible for transmission of this signal when answering an incoming call and monitoring this signal when dialing an outgoing call.

A disconnect is an on-hook signal applied to the called trunk or from the called trunk which ends the call connection.

In-band signalling is signalling that uses the same path or DSO channel as a customer's PCM data. The term "in-band signalling" is generic and can take the form of PCM encoded MF tones, rob bit signalling or call connection patterns.

E and M signalling is a traditional type of call signalling for an analog voice service from the telephone company's equipment. E and M type II signalling includes wink start and answer supervision. E and M is an acronym for ear and mouth, and in an analog service are the wires which provide the signalling path between the customer and the telephone company. The E and M wires are usually referred to as leads. In a typical plain-old-telephone service (POTS) application, the telephone company uses the E-lead to transmit signals towards the customer's equipment and uses the M-lead to receive signals from the customer's equipment. The E and M leads each provide two signalling states, on-hook and off-hook. When the analog phone line between the customer's equipment and the telephone company's equipment is idle, the E and M leads are in the on-hook state. The telephone company initiates a call towards the customer's equipment with a trunk seizure, an E-lead off-hook signal. A trunk seizure will persist until the end of the call. The customer's equipment will acknowledge the trunk seizure with an M-lead off-hook signal which is detected by the telephone company's equipment. This traditional method of signalling is one way the telephone company's equipment provides call signalling to the customer's equipment.

T1 equipment (i.e., DS-1 level service) does not use separate signalling leads to handle call signalling, but instead uses in-band signalling. The telephone company inband signalling is accomplished by use of A and B signalling bits. The A and B signalling bits occur at the sixth and twelfth frames of every T1 superframe (SF) and occupy the least significant bit (LSB) position of all 24 DSO channels during each of these frames. The telephone company's in-band signalling will overwrite or replace the LSB of the DSO channel data. This method of in-band signalling is referred to as robbed bit signalling. The A and B signalling bits indicate what signalling state each T1 DSO channel is in. The signalling bits translate directly to the E and M leads described above.

T1 NAC 175 can monitor and detect changes in signalling states of the A and B bits by use of T1 framer 229 which gives T1 NAC 175 the ability to detect incoming calls 10 from the telephone company's switching equipment. The T1 framer 229 also provides T1 NAC 175 with the capability to transmit A and B signalling bit information for all 24 DSO channels to the telephone company which allows T1 NAC 175 to respond to trunk seizures, answer calls and initiate disconnects.

Multifrequency (MF) in-band signalling is used to transmit numerical information and control signals from the telephone company's equipment to the customer's equipment. Quad modem cards 403–408 decide the MF tones during call set-up. The following paragraphs explain the MF tones, their sequences, and how they are used by the quad modem cards.

As shown in Table 1, MF signalling is made up of six frequencies which are paired up to make 15 MF tone combinations:

TABLE 1

| Frequencies in HZ | Digit or Control Signal |
| --- | --- |
| 700 + 900 | 1 |
| 700 + 1100 | 2 |
| 700 + 1300 | 4 |
| 700 + 1500 | 7 |
| 700 + 1700 | ST''' or ringback |
| 900 + 1100 | 3 |
| 900 + 1300 | 5 |
| 900 + 1500 | 8 |
| 900 + 1700 | ST' |
| 1100 + 1300 | 6 |
| 1100 + 1500 | 9 |
| 1100 + 1700 | KP |
| 1300 + 1500 | 0 |
| 1300 + 1700 | ST'' |
| 1500 + 170 | ST |

The MF tones indicate digits 0 through 9 and the special KP/ST tones that indicate the beginning and end of an MF tone sequence. The MF sequence received from the telephone company in the case of a feature group B service is –KP+950+XXXX+ST. The 950-XXXX portion of the sequence represents the carrier access code (CAC) which is the number dialed by the originating caller. The MF tones will be transmitted by the telephone company 70 milliseconds (ms) after T1 NAC 175 responds to the trunk seizure. The duration of each MF tone in the KP+950+XXXX+ST sequence is as follows: (1) the KP signal length will be 90 to 120 ms; (2) the ST and digit signals will be 58 to 75 ms; and (3) the interval between all MF signals will be 58 to 75 ms. The entire MF sequences will have maximum duration of 1.32 seconds.

The MF tones represent the dialed 950 number from the originating caller. The 950 numbers can be used to indicate to modem module 401 what type of modulation scheme (or other configuration parameters) to use for that call. For example, numbers may be assigned the following modulation schemes:

(1) 950–1754 can be assigned to 300, 1200 and 2400 baud V.22 BIS asynchronous modulation used for credit card verification with limited training by modems 403–408;

(2) 950–1772 can be assigned to 300 to 14.4K baud using various asynchronous modulation schemes for any speed interactive asynchronous communications with normal training by modems 403–408; and (3) 950–1755 can be assigned to Bell 208B 4800 baud half-duplex synchronous modulation.

Assigning 950 numbers to certain modulation schemes reduces the time quad modem cards 403–408 will spend training on the modulation scheme being sent from the calling modem, thus reducing the overall call connection time. Modem module 401 has the ability to execute a pre-configured AT command string based on the CAC.

The following section describes the process and signalling details of an incoming call, from call set-up and call connection, to call disconnect. This section will start with the processing sequence of an incoming call from the telephone company by T1 NAC 175 for a typical scenario of a feature group B with E and M signalling, wink start and answer supervision. A description of how the in-band signalling sequences between T1 NAC 175 and the quad modems 403–408 are accomplished, and how the connections between the telephone company and the modems are completed is summarized in FIG. 10.

Server NAS1 is capable of enabling full duplex data communication between all of computers C1–C12 and C13–C24 (FIG. 2) simultaneously. The communication between any pair of computers C1–12 and C13–24 is handled in the same manner. As a result, an explanation of the communication between computer C1 and computer C13 also explains simultaneous communication between other pairs of computers C1–C12 and computers C13–C24.

Assume computer C1 initiates a call to computer C13. Processor FEP1 has the capability of routing calls placed to a particular telephone number to an assigned one of computers C13–C24. Computer C1 provides call set-up information, including the telephone number assigned to computer C13, and digital data signals representing digital data. Assume that computer C13 is available on number 950-XXXX. Modem M1 converts the set-up information and digital data to analog telephone signals on line A1. Network TC1 converts the signals to digital T1 telephone signals. The telephone company network TC1 then initiates a call to T1 NAC 175 via span line T1. Assume that the T1 channel receiving the call is assigned to modem 447 (FIG. 7).

Figure 10:
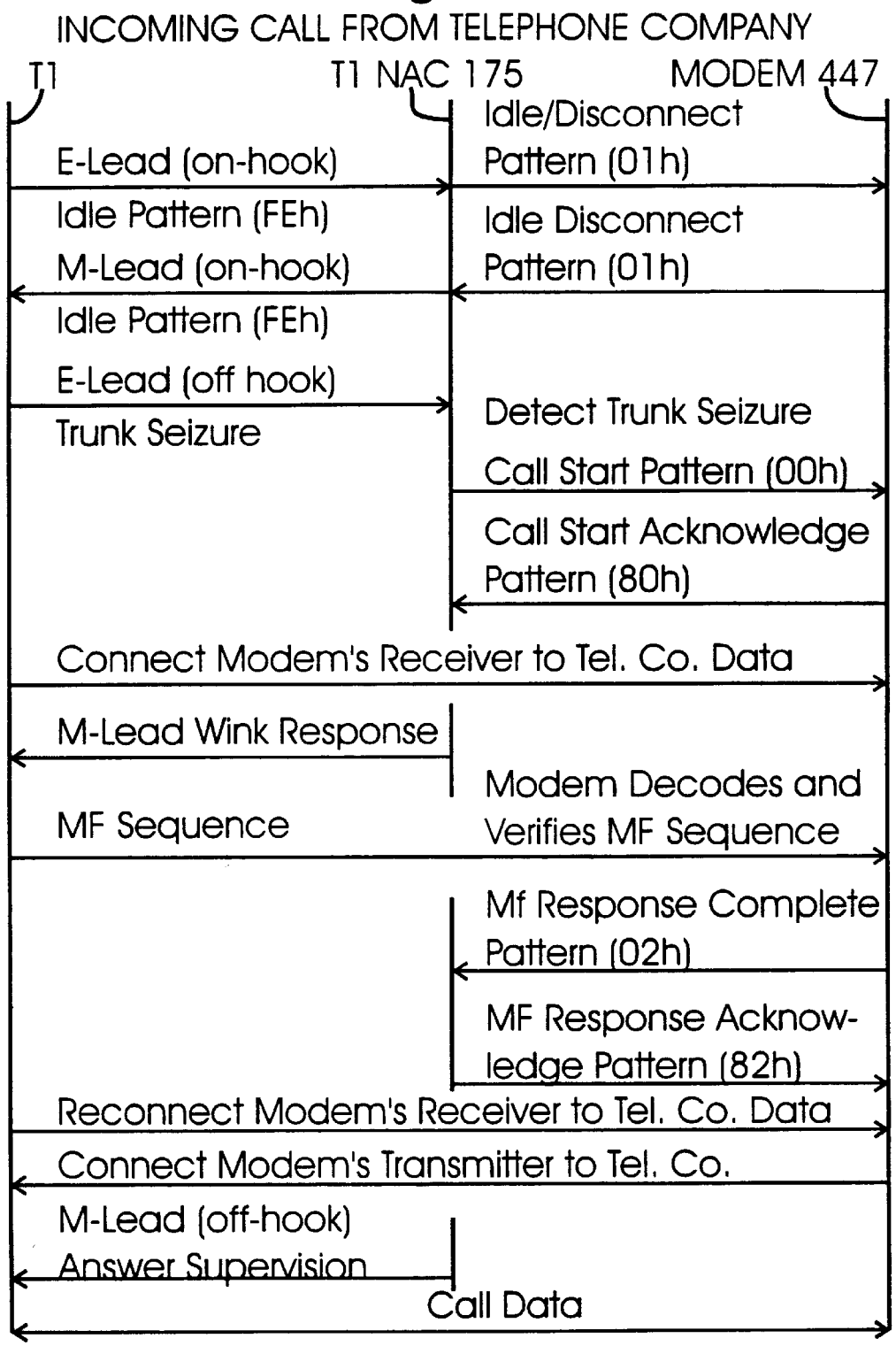
FIG. 10 is a flow diagram showing the processing of an incoming call from telephone company network TC1 by the network access server shown in FIG. 2.

FIG. 10 shows call set-up signals flowing from line T1 to T1 NAC 175 and data signals being transmitted between line T1 and modem 447. The remaining signals shown in FIG. 10 are call control signals.

The trunk is considered to be in the idle state when not in a call connection. During the idle state, the telephone company is transmitting E-lead on-hook (via A and B signalling bits) and T1 NAC 175 is transmitting M-lead on-hook. The modem assigned to that trunk (modem 447) is not connected to the telephone company at this time. T1 CPU 241 has programmed time/space switch 203 to transmit the idle/disconnect pattern (01 h) to modem 447 via TDM bus 151 and idle pattern (FEh) to the telephone company via bus 230, T1 framer 229 and line interface unit 123. Modem 447 is in the idle condition transmitting the idle/disconnect pattern to T1 NAC 175 and waiting to receive the call start pattern (00 h) from T1 NAC 175. T1 CPU 241 monitors (via unit 123, framer 229 and bus 230) for the E-lead off-hook signal from the telephone company which initiates a call set-up sequence.

Switch 203, bus 230 and TDM bus 151 (FIG. 4) offer a unique advantage for processing incoming and outgoing calls. T1 CPU 241 can control the transmission of call control signals to and from modem 447 via bus 230, switch 203 and TDM bus 151 during one time period. During another time period, T1 CPU 241 can communicate with line T1 via bus 230, T1 framer 229 and line interface unit 123. At other times, T1 CPU 241 can control the transmission of data between modem 447 and line T1 via TDM bus 151, switch 203, bus 203, framer 229, and line interface unit 123. The arrangement of components shown in FIG. 4 provides a fast and economical technique for processing both incoming and outgoing calls.

The call set-up sequence begins with a trunk seizure. The trunk seizure is done by the telephone company equipment transmitting an E-lead off-hook signal (FIG. 10). The seizure is shown in FIG. 11 on the E-lead line. Using T1 framer 229 to detect the off-hook state of the E-lead, T1 NAC 175 debounces and verifies the trunk seizure within 40 ms from the time it was received by T1 CPU 241.

Once T1 CPU 241 has determined that the E-lead seizure is valid, it uses an in-band signalling pattern to notify modem 447 via bus 230, switch 203 and TDM 151. T1 CPU 241 programs the call start pattern (00 h) into time/space switch 203 which begins transmitting this pattern to modem 447 via TDM bus 151 during every frame of the TDM bus time-slot. At this time, modem 447 is not connected to the telephone company trunk and is not receiving telephone company data or transmitting data to the telephone company. T1 CPU 241 expects a call start acknowledge pattern (80 h) from modem 447 and uses time/space switch 203 to detect this pattern via TDM bus 151 and bus 230. T1 CPU 241 requires approximately 16 ms to detect and verify any pattern from a modem received via TDM bus 151, switch 203 and bus 230.

When T1 CPU 241 has detected and verified the acknowledge pattern (80 h) from modem 447, it programs time/space switch 203 to connect the modem's receive data to the incoming telephone company trunk via TDM bus 151, bus 230, T1 framer 229 and line interface unit 123. The modem's transmit data is not connected to the telephone company trunk at this time. The modem's receive data connection is made in preparation for the receipt of the MF tone sequence from the telephone company. Before the wink is sent to the telephone company, 210 ms must elapse from the time of the E-lead seizure (time period B, FIG. 11). T1 CPU 241 then sends the M-lead wink response pulse, which is a transition to the off-hook state for 200 ms, then back to onhook (time period C, FIG. 11).

If no acknowledge pattern is received from modem 447 after 4 seconds, T1 CPU 241 records the event and will not respond to the telephone company. If a time-out occurs, T1 CPU 241 programs time/space switch 203 to transmit idle/disconnect pattern (01 h) to modem 447. At this time, no connection between the telephone company and modem 447 exists and modem 447 should return to the idle condition during which modem 447 transmits the idle/disconnect pattern (01 h) to T1 NAC 175.

Figure 11:
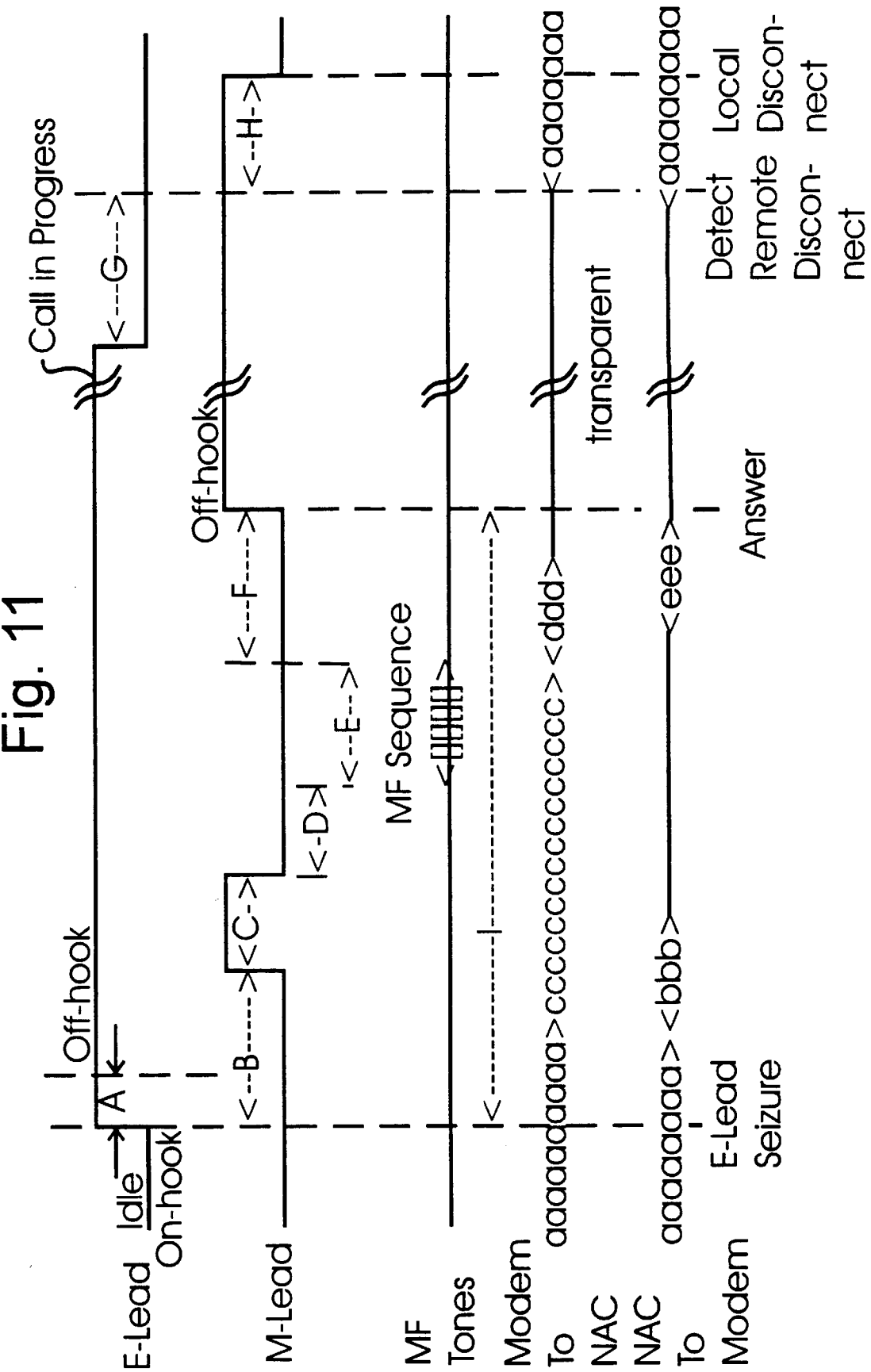
FIG. 11 is a timing diagram showing the processing of an incoming call of the type shown in FIG. 10.

The telephone company begins transmitting the MF sequence 70 ms after it detects the M-lead wink (time period E, FIG. 11). Modem 447 receives the KP+950+XXXX+ST MF sequence (via unit 123, framer 229, bus 230, switch 203 and TDM bus 151) during a time period of approximately 1.32 seconds. Immediately after modem 447 detects the ST tone, it verifies the entire MF sequence, and then transmits the MF complete pattern (02 h) to T1 NAC 175. T1 CPU 241 detects the MF complete pattern (via TDM bus 151, switch 203 and bus 230) in approximately 16 ms and programs time/space switch 203 to send the MF complete acknowledge pattern (82 h) to modem 447 via TDM bus 151. T1 CPU 241 transmits the 82 h pattern for 20 ms and then completes the connection of modem 447 to the telephone company by programming time/space switch 203 to connect TDM bus 151 to bus 230, framer 229 and line interface unit 123. The connection between the modem and the telephone company is now complete and the modem begins to look for incoming carrier from calling modem M1. Full duplex communication between modems M1 and 447 is enabled.

Modem 447 demodulates the digital telephone signals received over TDM bus 151 to form corresponding digital network bus signals comprising packets of digital time-spaced signals representing data and call setup information without creating analog telephone signals. The digital network bus signals are transmitted over packet bus 501 in a manner to be described. The network bus signal is processed and transmitted over network TRN1 to computer C13 for display.

Conversely, digital network signals originating at computer C13 and over packet bus 501 are modulated by modem 447 to form digital telephone signals without creating analog telephone signals. The unique operation of modem processor 473 which enables this result is described in connection with FIG. 28. The modulated digital telephone signals are transferred over TDM bus 151, through switch 203 and over bus 230 to T1 framer 229. The framed signals are multiplexed in unit 123 and transmitted to line T1 (FIG. 4).

The digital telephone signals are converted to analog form by network TC1 and are reconverted to digital data signals by modem M1. The digital data signals are then displayed by computer C1.

If for any reason modem 447 cannot verify the MF sequence, it will not respond to T1 NAC 175 with the MF complete pattern (02h). After 4 seconds, T1 CPU 241 times out and programs time/space switch 203 to transmit idle/disconnect pattern (01 h) to modem 447. T1 CPU 241 does not respond to the telephone company in this case and maintains the M-lead on-hook state and logs the event. The telephone company network time-outs when it does not receive the answer signal on the M-lead (FIG. 11) from T1 NAC 175 and also logs the event. The telephone company returns the trunk to the idle state and is ready to assign another call.

After the connection of the telephone company to modem 447 is complete, T1 NAC 175 must respond with an answer signal (M-lead off-hook) (FIG. 10). This will indicate to the telephone company that the call connection should be completed. However, there must be a 100 ms delay from the time the ST tone is received by the modem to the time the answer signal is transmitted to the telephone company. Once the signal delay condition is satisfied, T1 CPU 241 programs T1 framer 229 to transmit the M-lead off-hook answer signal to the telephone company. The M-lead off-hook answer signal persists for the duration of the call connection. At this point, the call connection is complete and the calling modem M1 and modem 447 begin communicating.

From the information given in FIG. 11, assuming a 1 DNIS address digit is received, a time period of 0.910 seconds normally is required from the time of trunk seizure to the time modem 447 actually is connected to the telephone company. The maximum time for such a connection is 2.37 seconds.

A timing diagram of the dial-in call processing shown in FIG. 10 is provided in FIG. 11. The E-lead, M-lead and MF tones signals shown in FIG. 11 appear in digital form on line T1. The letters used in FIG. 11 have the following meanings and time durations in which "Typ" means typical:

| Symbol | Description | Min | Typ | Max | Units |
|---|---|---|---|---|---|
| A | E-lead seizure debounce | 40 | 45 | 50 | ms |
| B | Seizure to wink delay | 210 | 220 | 230 | ms |
| C | Off-hook wink duration | 140 | 200 | 210 | ms |
| D | Wink to multifrequency (MF) delay | 70 | 100 | | ms |
| E | Multifrequency (MF) sequence duration | 0.26 | .47 | 1.4 | sec |
| F | ST tone to call answer supervision delay | 100 | 110 | 120 | ms |
| G | E-lead on-hook call disconnect delay | 300 | 315 | 320 | ms |
| H | E-lead on-hook to M-lead on-hook delay | | 20 | 50 | ms |
| I | Trunk seizure to answer supervision | 0.78 | 1.1 | 4.0 | sec |

| Symbol | Pattern |
|---|---|
| a | Idle/disconnect pattern (01h) |
| b | Call start pattern (00h) |
| c | Call start acknowledge pattern (80h) |
| d | MF complete pattern (02h) |
| e | MF complete acknowledge pattern (82h) |

Figure 12:
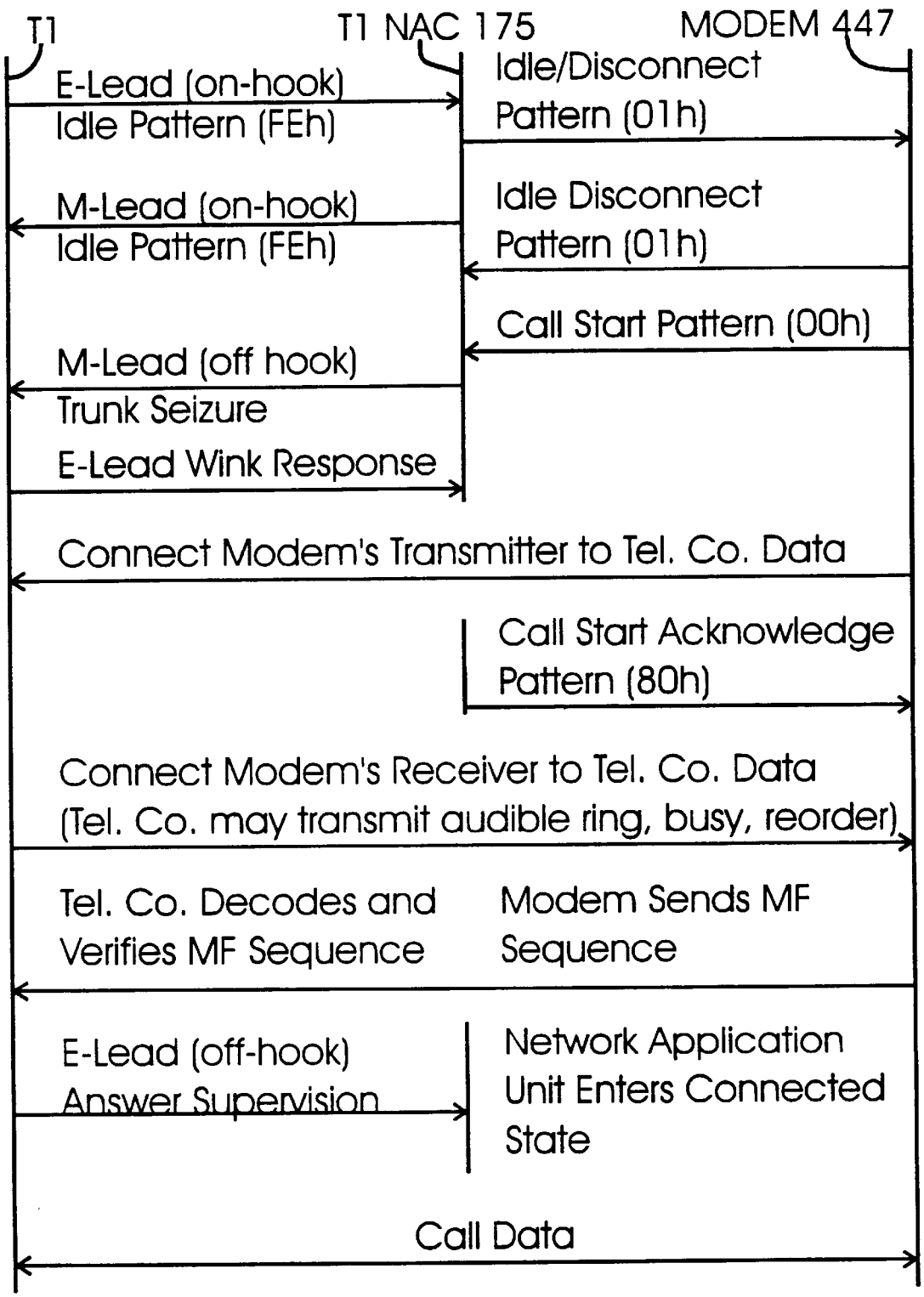
FIG. 12 is a flow diagram illustrating the processing of an outgoing call from the network access server shown in FIG. 2.

FIG. 12 depicts the event flow between the telephone company line T1 and modem module 401 when making an outgoing tone dial call from modem module 401. For this example, assume that modem 447 (FIG. 7) receives network digital data signals from computer C13 that are to be sent to computer C1 (FIG. 2). The digital data from computer 13 is received via network TRN1 (FIG. 2) and packet bus 501 (FIG. 7). Modem 447 also receives from computer C13 call setup information including the telephone number assigned to computer C1.

FIG. 12 illustrates the call set-up MF sequence transmitted by modem 447 that results from the call set-up information received from computer C13. FIG. 12 also illustrates the call control signals transmitted between T1 NAC 175 and modem 447, as well as the call control signals transmitted from T1 NAC 175 to line T1.

Dial out calls begin with line T1, T1 NAC 175 and modem 447 in an idle state. Modem 447 initiates the call by sending a "call start" pattern (00 h) to T1 NAC 175, which in return seizes the M-lead to the telephone company via switch 203, bus 230, framer 229 and unit 123 (FIG. 12). The telephone company winks back with the E-lead response at which time T1 NAC 175 creates the data path from modem 447's transmitter to the telephone company via TDM bus 151, switch 203, bus 230, framer 229 and unit 123. When the data path is complete, T1 NAC 175 sends the "call start acknowledge" pattern (80 h) to modem 447 to tell modem 447 that it can send the MF tones to dial the phone number. After the MF tones are sent and the telephone company is beginning to actually dial the call, modem 447 will end the "MF complete" pattern to T1 NAC 175. This informs T1 NAC 175 to connect modem 447's receive data path to the telephone company. At this time, the telephone company may send call progress information, such as audible rings, busy or reorder messages.

Assuming that the call is successfully completed, the telephone company responds with an E-lead off-hook, answer supervision. T1 NAC 175 temporarily breaks the data path to modem 447 and send the "MF complete acknowledge" pattern to inform modem 447 that the call has been answered, and then reconnects modem 447's receiver to the telephone company so that fill duplex call data communication can take place between modem 447 and modem M1.

Figure 13:
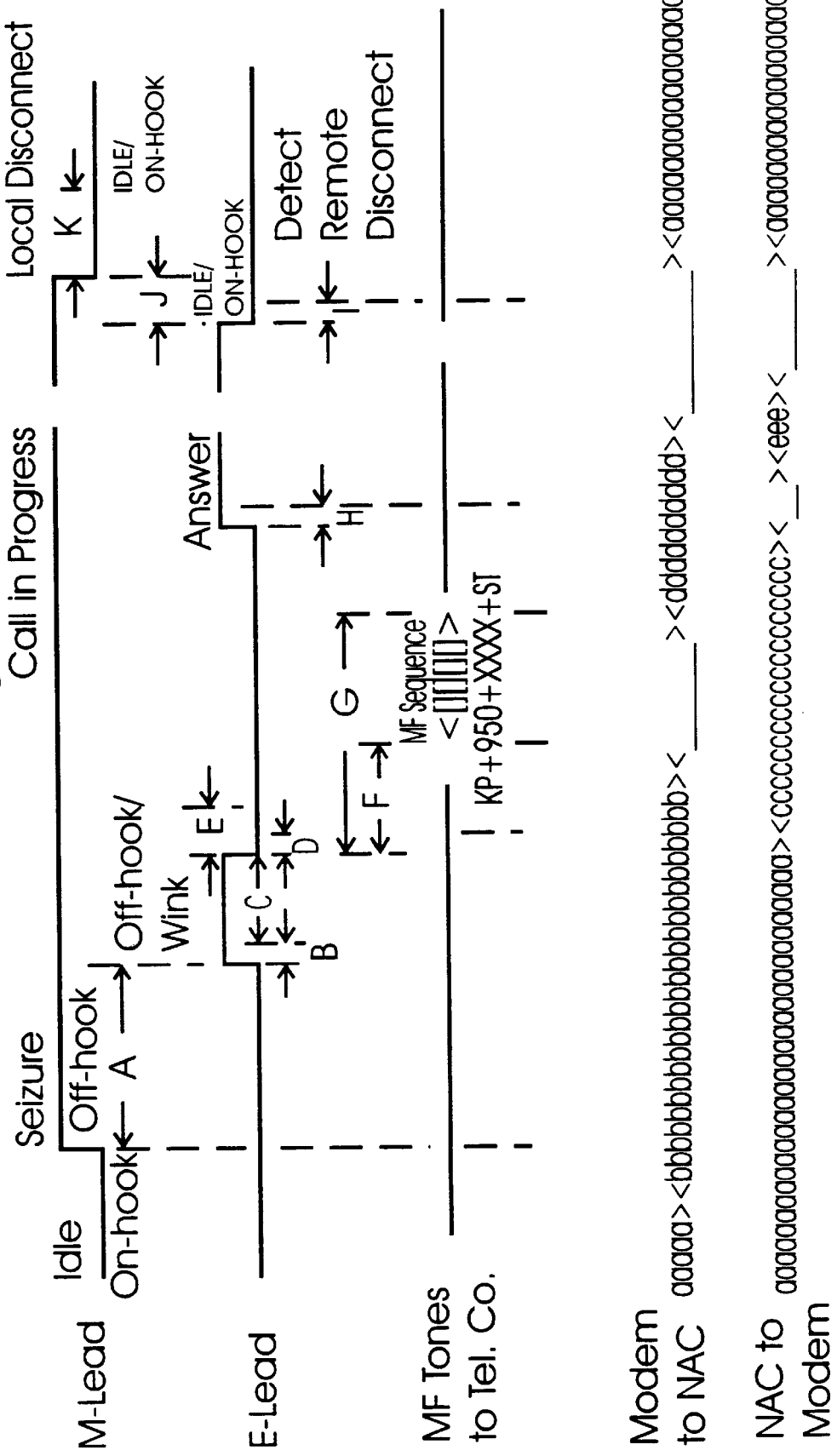
FIG. 13 is a timing diagram showing the processing of an outgoing call of the type shown in FIG. 12.

FIG. 13 depicts the timing associated with making a dial out call. The overall actual time to make a dial out call depends on several factors, including the telephone company's response times and the number of digits and speed of the dialed telephone numbers. The M-lead, E-lead and MF tones signals shown in FIG. 13 appear in digital form on line T1.

The letters used in FIG. 13 have the following meanings and time durations in which "Typ" means typical:

| Symbol | Description | Min | Typ | Max | Units |
|---|---|---|---|---|---|
| A | E-lead seizure to wink | 210 | 220 | 5000 | ms |
| B | E-lead start of wink debounce | 40 | 45 | 50 | ms |
| C | Off-hook wink duration | 70 | 200 | 290 | ms |
| D | M-lead end wink debounce | 40 | 45 | 50 | ms |
| E | Wink to multifrequency delay | 70 | xx | xx | ms |
| F | Wink to first MF digit | 0 | xx | 5 | sec |
| G | Wink to last MF digit | 0 | xx | 15 | sec |
| H | E-lead answer debounce | 40 | 45 | 50 | ms |
| I | E-lead disconnect bounce | 40 | 45 | 50 | ms |
| J | E-lead disconnect to M-lead disconnect | 300 | xx | xx | ms |
| K | M-lead on-hook call disconnect delay | 250 | xx | xx | ms |

| Symbol | Pattern |
|---|---|
| a | Idle/disconnect pattern (01H) |
| b | Call start pattern (00H) |
| c | Call start acknowledge pattern (80H) |
| d | MF complete pattern (80H) |
| e | MF complete acknowledge pattern (82H) |
| f | Call fail pattern (xxH) |

After the telephone company goes on-hook to disconnect the call at time I of FIG. 13, the billing clock is not stopped until (1) T1 NAS 175 goes on-hook for 250 ms (time K); or (2) a time-out period of up to 20 seconds elapses. If the called CPE returns the trunk to an off-hook condition before either of the above events occur, the call will not be disconnected.

Hits are defined as on-hook to off-hook to on-hook pulses lasting less than 70 ms. These should not be taken as answers or winks.

In-band tones, such as audible ringing, busy and reorder, may be present from the telephone company after the address digits have been received by the telephone company. These in-band signals can be used by modem 447 to hang up the call if it is busy or reorder.

A standard interpolation algorithm enables modem processor 473 to convert the digital telephone signals on line T1 into the form which can be used for demodulation by existing modems of the type used in quad modems 403–408. Another standard interpolation algorithm enables modem processor 473 to convert its standard modulated signals into a form which can be transmitted on line T1. A modem processor controlled by such an algorithm offers an advantage because it enables modulation and demodulation without converting digital telephone signals to analog telephone signals while saving the time and expense of designing new modem circuits for modulation and demodulation.

Communication between modem module 401 and gateway application card 605 is achieved over packet bus 501 which uses packet data switching, a method of sending data in messages, or packets, only when there is data to transmit. That is, blocks of data are transmitted asynchronously. Packet bus 501 only requires a virtual connection, and does not require a dedicated amount of bus bandwidth to support a connection. Therefore, the available bandwidth can be statistically shared among many devices. Packet bus 501 does not use up any bandwidth when it has nothing to send, and it uses the full bus bandwidth when it does have something to send.

Packet bus 501 is a statistical time division multiplexed bus. The word "statistical" denotes that the bus bandwidth is not necessarily divided evenly among the devices accessing the bus, but is provided on demand. This type of bus makes use of the fact that data is bursty, and therefore, all of the devices will usually not have data to send at the same time.

Packet bus 501 can make use of the maximum available bandwidth at a given time, as opposed to an assigned fraction of the available bandwidth, as is done on a TDM bus 151. On TDM bus 151, data is transmitted synchronously in assigned time slots that occur periodically at regular time intervals. Due to the bursty nature of data communications, the data throughput of packet bus 501 at times can be many times larger than that of a synchronous circuit switched time division multiplex bus, such as TDM bus 151, with the same bit transfer rate.

Packet bus 501 is a transport mechanism between modem module 401 and getaway application card 605. The available bandwidth is divided among modems that currently have data to transmit across bus 501.

Packet bus 501 conforms closely to the ANSI/IEEE NuBus standard and is a 32-bit parallel bus operating at 10 MHz. It utilizes a multiplexed address/data bus and supports multiple bus masters, with deterministic arbitration and fairness. The maximum data transfer rate of bus 501 is 40 Mbytes per second. Because the address and data busses are multiplexed, the actual data transfer rate is slightly lower than the maximum value. Bus 501 supports block transfers, where a block transfer is an address cycle followed by multiple data transfer cycles. A typical data transfer rate over a 32-bit implementation of bus 501 using 64 byte block transfers is approximately 36 Mbytes per second.

Data is passed between the modems on cards 403–408 and gateway card 605 in frames. Each modem accessing the bus 501 has a data link layer entity that builds/parses the outgoing/ingoing frames. The function of the data link layer is to provide a transparent interface between multiple devices over packet bus 501. The data link layer removes the details of this interface from upper layers that need to access the bus. The data link layer segments data into messages or frames. Each frame is transmitted across bus 501 via a NuBus block transfer. Exactly one frame is transmitted per block transfer.

The data link layer offers a connectionless service, and a connection oriented service, with sliding window flow control as well as physical layer flow control. The connection oriented services are a subset of the IEEE 802.2 type 2 connection oriented logical link control (LLC). All signals on packet bus 501 conform to section 3.3.2 "DC and AC specifications of packet bus signals" of ANSI/IEEE Std. 1196–1987 (NuBus).

Packet bus 501 uses the following data transfer signals:

PB_AD0-31 (address and data) (active low) These lines are multiplexed to carry address information at the beginning of a transaction and 8, 16 or 32 bits of data later in the transaction.

PB_TM0-1 (transfer mode) At the beginning of the transaction, these two lines indicate the type of transaction being initiated. Later in the transaction, the responding module uses them to indicate success or failure of the requested transaction.

PB_START (start signal) (active low) This signal is asserted at the start of a transaction, and also initiates an arbitration contest. Additionally, when asserted in conjunction with the PB_ACK line, it denotes special non-transaction cycles called attention cycles.

PB_ACK (transfer acknowledge) (active low) The usual use of this signal is to indicate the ending cycle of a transaction. It has a special use if asserted during the same cycle with PB_START.

The functions of IEEE 802.2 used by the data link layer are link setup and recovery, parameter negotiation and sliding window flow control. All data transferred over packet bus 501 resides in a layer 2 frame. Each frame consists of header information, followed by user data. The following types of frames are implemented:

| Frame Types | Abbreviation | 802 Equivalent |
| --- | --- | --- |
| Link-Start | LS-Frame | SABME |
| Link-Start Acknowledge | LSA-Frame | UA |
| Unnumbered Info. Frame | UI-Frame | UI |
| Information Frame | I-Frame | I |
| Exchange Identification | XID-Frame | XID |
| Receiver Ready (RR) | RR-Frame | RR |

The link-start and link-start acknowledge frames are used in data link set-up and recovery. XID frames are used, once the link is brought up, for parameter negotiation. The I-frame contains send and receive sequence numbers, Seq(s) and Seq(r), used to implement layer 2 flow control. The UI frames do not have sequence numbers and are not subject to flow control, so they are normally used for sending data that cannot be flow controlled. The purpose of the RR frame is to acknowledge frames that a card has previously received.

Any device that wishes to communicate with another device over packet bus 501 must set up a connection (or link) to the device with which it wishes to communicate. The link is accomplished using IEEE 802.2 link set-up procedures. Each device maintains a variable for each link that it is defined to have, indicating the condition of the link.

The link-start frame and the LSA frame are used to bring up a link between two cards (eg., modem card 408 and gateway application card 605). Once the link is up, the cards are said to be in the link negotiation state. Before the link is brought up, several link state variables have to be initialized. Link setup procedures begin by setting Seq(s) and Seq(r) to 0, then the ACK_WAIT, and ACK timers should be stopped. At this point, an LS or an LSA frame can be sent.

When modem 447 on card 408 wishes to bring up a link with gateway card 605, it sends a link-start (LS) message to card 605 and starts the ACK_WAIT timer. When card 605 receives the link-up message, it responds with a link start acknowledge (LSA) frame. At the time that card 605 sends the LSA frame, it marks the link between the two cards as up. At the time that modem 447 receives the LSA, it marks the link as up.

If the ACK_WAIT timer were to time-out while waiting for the LSA, modem 447 would send another link-start frame. Modem 447 continues to send link-start frames indefinitely until it receives an LSA or until it is told to stop.

If a device is not waiting for an LSA-frame on a particular link, and it receives an LSA from that link, it discards the frame and the link state will not change.

When a device is in the "link up" condition and it receives a link-state frame, it should mark this line as down; initialize all link state variables and timers; return all user data buffers to the free buffer pool; send an LSA-frame and mark this link as up.

If modem 447 sends a link-start frame to card 605 and is waiting for an LSA response, but instead receives a link-start frame from card 605, then modem 447 proceeds as though it had received an LSA-frame from card 605 and marks the link as up.

In the event of any unrecoverable error that occurs affecting the communications between modem 447 and card 605, the device detecting the error marks the link as being "down" in the link state variable. The device then initiates the above link setup procedures.

When a link is brought from the link up state to the link down state, all link state variables must be reset and all buffers currently queued in either direction for this link are returned to the free buffer pool. Additionally, link setup procedures attempt to reestablish a link several times (as determined by the session down counter) before informing any third party equipment. The default value of the session down counter is 3.

After a card (e.g., modem card 408) sends an LS frame, it will start the "LS retransmission timer." This timer is initialized with the value of the system parameter LS_Timer. The value of LS_Timer is programmable. The default value is 5 seconds. Modem 447 continues to send LS frames indefinitely, or until it receives an LSA response.

The "link-up" state has two sub-states, the "link negotiation" state and the "information transfer" state. The link negotiation state is entered at the same time that the link up state is entered. While in the link negotiation state, each card sends an XID frame to the other card (e.g., card 605) in the link. The XID frame contains information that is used to get both cards in a link to agree on certain parameters, such as receive window size and packet bus block size. After a card in the link negotiation state has sent and received an XID frame, it stores the various agreed upon parameters and marks the link as being in the information transfer state. The parameters agreed upon after exchanging XID frames cannot be changed during a communication session. For example, the receive window size the packet bus block size, once agreed upon by both cards, cannot be changed during the session. A new session has to be started to change these parameters.

When a card is in the link negotiation state, it sends an XIID frame to the other end of the link, start the $ACK_{13}$ WAIT timer and waits for an XID frame from the other end of the link. If the card has not received a valid XID frame before the ACK_WAIT timer expires, the link is marked down and link setup procedures begin again. When it receives an XID, it stops the ACK_WAIT timer.

When a link state changes to "information transfer," all link state variables must be reset. These variables include Seq(s); Seq(r); ACK timer; and ACK_Wait timer. When a device is in the "link up" condition and it receives a link-start frame, it must reset all above link state variables and return all user data buffers to the free buffer pool. It then sends an LSA-frame to the device that sent it the link-up frame.

In the information transfer state, two types of information frames can be exchanged: unnumbered information (UI) frames and information (I) frames. UI frames provides connectionless datagram services. They are not sequenced and are not subject to flow control. I frames provide connection oriented services. They are sequenced and are subject to flow control.

UI frames are used to send messages that cannot be flow controlled, such as disconnecting a call immediately, since the UI frames are not subject to flow control as are I (information) frames. For example, if for some reason card 605 is flow-controlled by a modem, there is no way for card 605 to send an immediate disconnect command to the modem using an I frame. However, card 605 can send the immediate disconnect command to the modem in a UI frame without being flow-controlled.

All cards reserve some buffers for accepting UI frames, separate from those allocated for the I frames. In this way, when a card exhausts all its buffers allocated for the I frames and flow-controls its communicating partner, there are reserved buffers to accept UI frames. The buffers allocated for UI frames are used in a circular fashion, i.e., they are circular buffers. Each card has at least one buffer large enough to accept one UI frame. In this situation, the one and only buffer will be overwritten every time a UI frame arrives, i.e., it is a one-buffer circular buffer.

Once a link is in the information transfer state, the NAS1 cards use a sliding window protocol to implement flow control. A sliding window protocol uses sequence numbers and acknowledgements to keep track of how many more packets a card can transmit to another card before it will begin to overflow that card. In this way, a transmitting card can throttle itself before it wastes CPU time trying to transmit a message that a remote card will not be ready to receive.

In order to implement such a protocol, each I frame contains a "send sequence number," referred to as "Seq(s)." The current value of Seq(s) is inserted into every I frame transmitted. After storing Seq(s) into the current outgoing I frame, Seq(s) will be incremented by one. The send sequence number is not incremented past 127, but instead wraps around to 0. Every acknowledge frame has a "receive sequence number," referred to as "Seq(r)." When a card sends a frame with a receive sequence number field, the value used for Seq(r) will be the value of the last received I frame's Seq(s) +1. That is, the Seq(r) that is sent to a card identifies the next expected frame, not the last received frame. Both I frames and RR frames have Seq(r) fields and can be used to acknowledge previously received frames. A set of sequence numbers (as well as all other state variables) is kept for each link that a card may have. Before gateway card 605 can have 24 links with modem module 401, it must maintain 24 sets of link state variables.

In a sliding window protocol, many received I frames can be acknowledged with one RR frame or one I frame. Therefore, a card can send multiple frames to another card without receiving any acknowledgement. So that a card cannot overflow another card with data, each card is restricted to a maximum number of outstanding (i.e., unacknowledged) I frames that it may transmit to another card. This maximum number of outstanding frames that a card may receive is called the "receive window size" (or just the "window size"). When two cards have a link with each other, each card must inform the other card of its receive window size. The window sizes need not be the same in both directions. The value of the window size is determined by a card's ability to buffer data that it receives from the packet bus. If cards A and B are communicating, and if card A has a much larger buffering capacity than card B, card B should be allowed to send more outstanding frames to card A than card A is allowed to send to card B. Therefore each side of a link may have a different receive window size. Additionally, a card (e.g., card C) may choose to use one receive window size for a link with card A, and a different receive window size for a link with card B.

The default window size is 8 and the maximum allowable value for the window size is 127. A card determines if it can transmit an I frame to another card by subtracting its local value of Seq(s) (the sequence number of the next I frame that the card will send) from the last received Seq(r). If the result is less than the window size, then that card may transmit another I frame. A card can always transmit an RR frame regardless of the number of outstanding I frames.

If a card wishes to use a window size other than the default, it must inform the other side of the link by including the receive window size in the XID frame. The XID frame must be sent between cards during the link negotiation state.

Two timers are implemented to support the sliding window protocol. The ACK timer is used to tell a card when it must send an RR frame to another card. There will be one ACK timer for each link that a card has (e.g., gateway card 605 can have up to 24 ACK timers, one for each modem channel). The ACK timer is started whenever a card receives an I frame and the ACK timer is not already running. A card stops the ACK timer for a link whenever it acknowledges all received frames, by sending an I frame or an RR frame. When the ACK timer for a link expires, a card sends an RR frame with a current value of Seq(r) across the link The other timer that a card must maintain for each link is the ACK_WAIT timer. This timer tells a card how long to wait for an acknowledgement before resetting the link. This timer is started when an I frame is transmitted if it is not already running. This timer is stopped whenever the most recently transmitted I frame is acknowledged. This timer is restarted whenever a frame is received with Seq(r) greater than the last received Seq(r), and Seq(r)<Seq(s) of the most recently transmitted I frame. When this timer expires, the link is marked as down and link setup procedures are started.

The default values are ACK timer=100 ms and ACK wait timer=500 ms. If a device determines that it must temporarily stop receiving frames, it will write a 1 to the "NAK all frames" register. When this register contains a 1, the packet bus control logic forces a NAK (with a status, indicated by PO_TM0 and PB_TM1, of "try again later") on the first cycle following the start cycle for every frame it receives. The control logic continues to do this until CPU 633 clears the "NAK ALL frames" register.

Since the sliding window protocol provides flow control capability, the physical layer flow control is normally exerted when a card has some catastrophic errors that prevent it from receiving any data. Therefore, physical layer flow control should be treated as severe an error as a bus error. For this reason, a card experiencing physical layer flow control marks the link as down, initializes all link state variables and timers, and starts the link set-up procedure again to recover the link.

Figure 14:
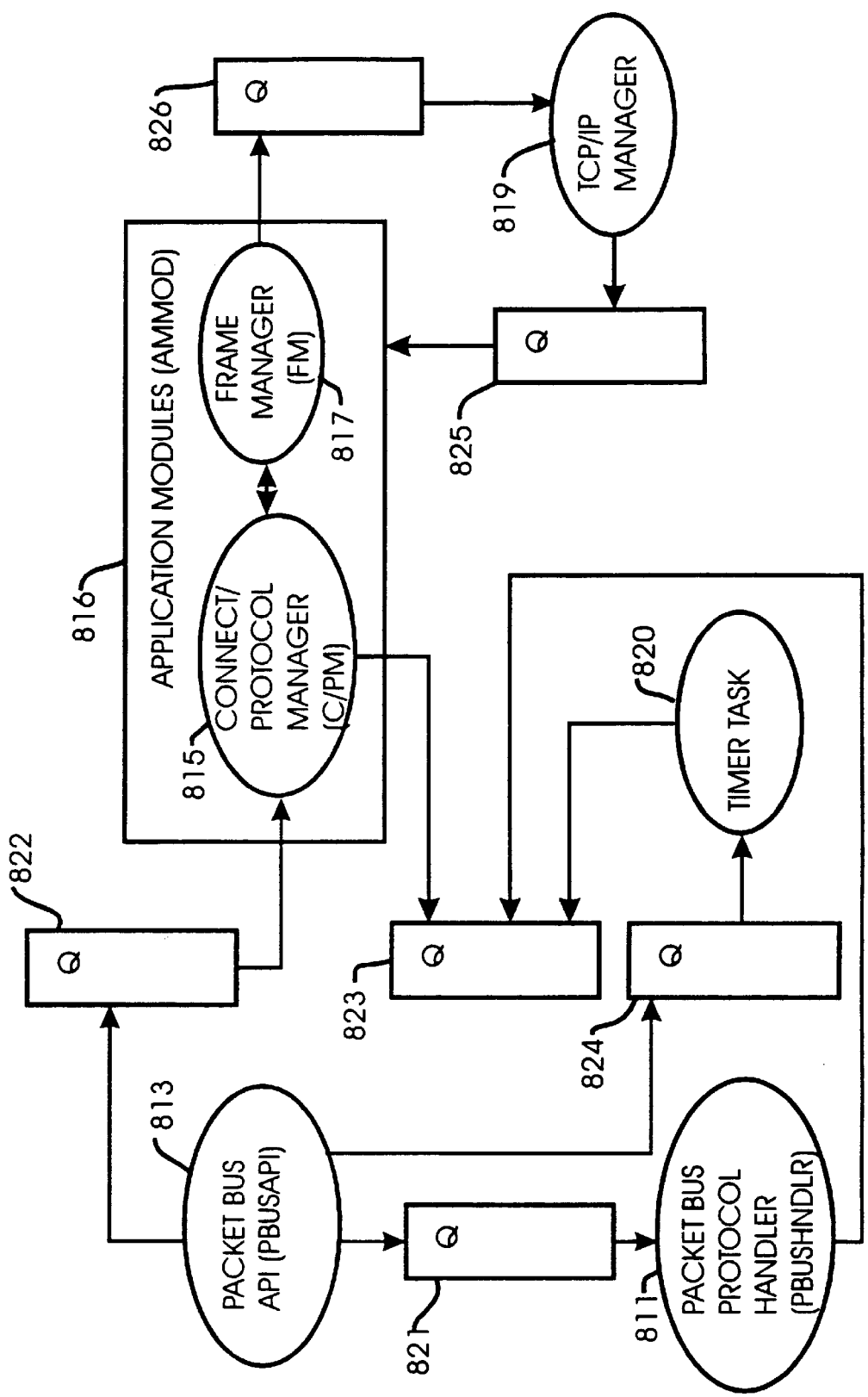
FIG. 14 is a flow diagram illustrating computer programs that control the flow of signals between the modems and the token ring network shown in FIG. 3.
Figure 14A:
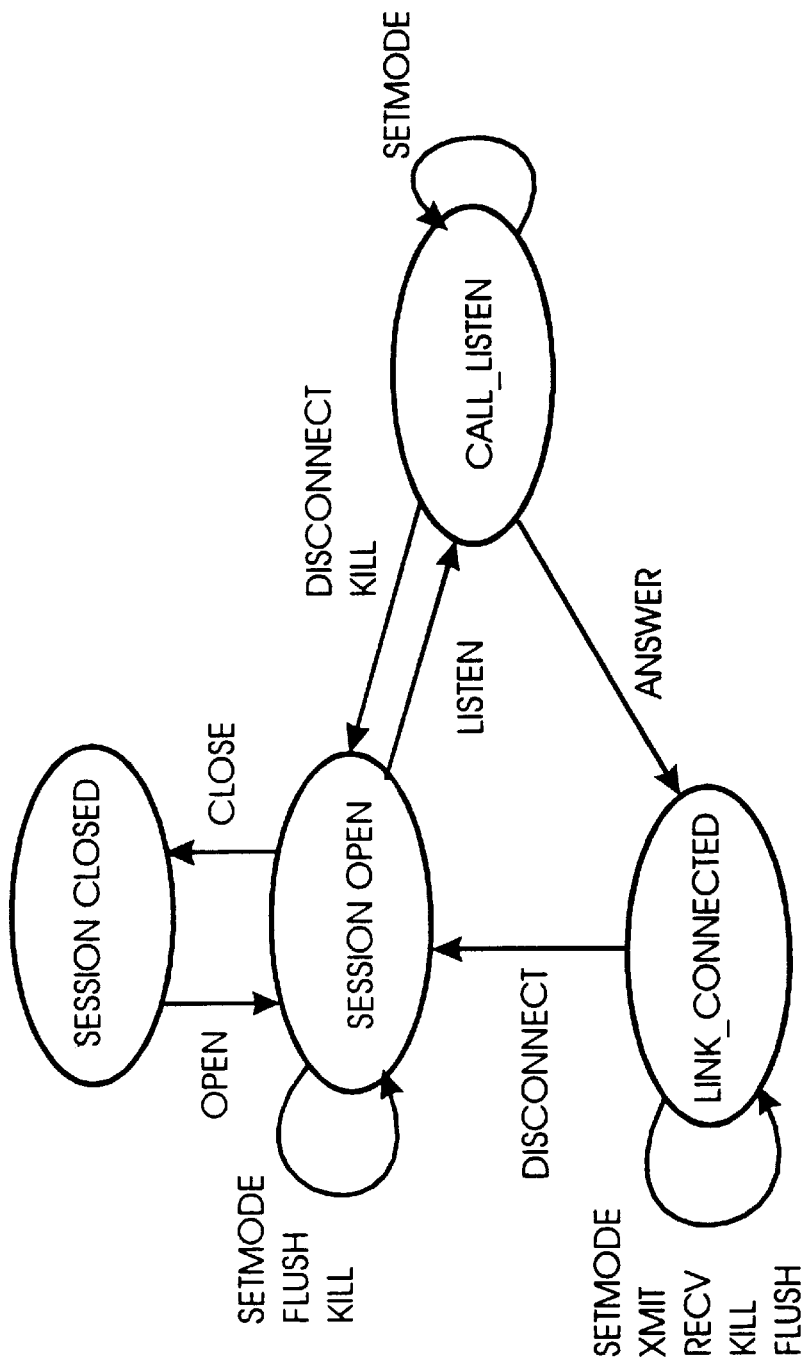
FIG. 14A is a state transition diagram showing various states of the pBusAPI program illustrated in FIG. 14.
Figure 14B:
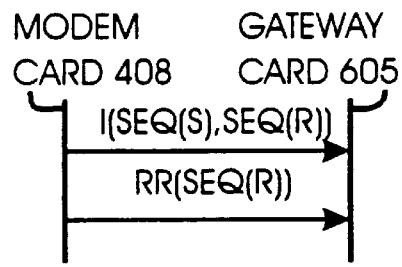
FIG. 14B is a flow diagram showing notation for I frames and RR frames illustrated in FIGS. 14C and 14D.

FIG. 14B depicts I frames with the send sequence and receive sequence numbers shown within parentheses. FIG. 14B shows how sequence numbers are illustrated in FIGS. 14C–14E.

Figure 14C:
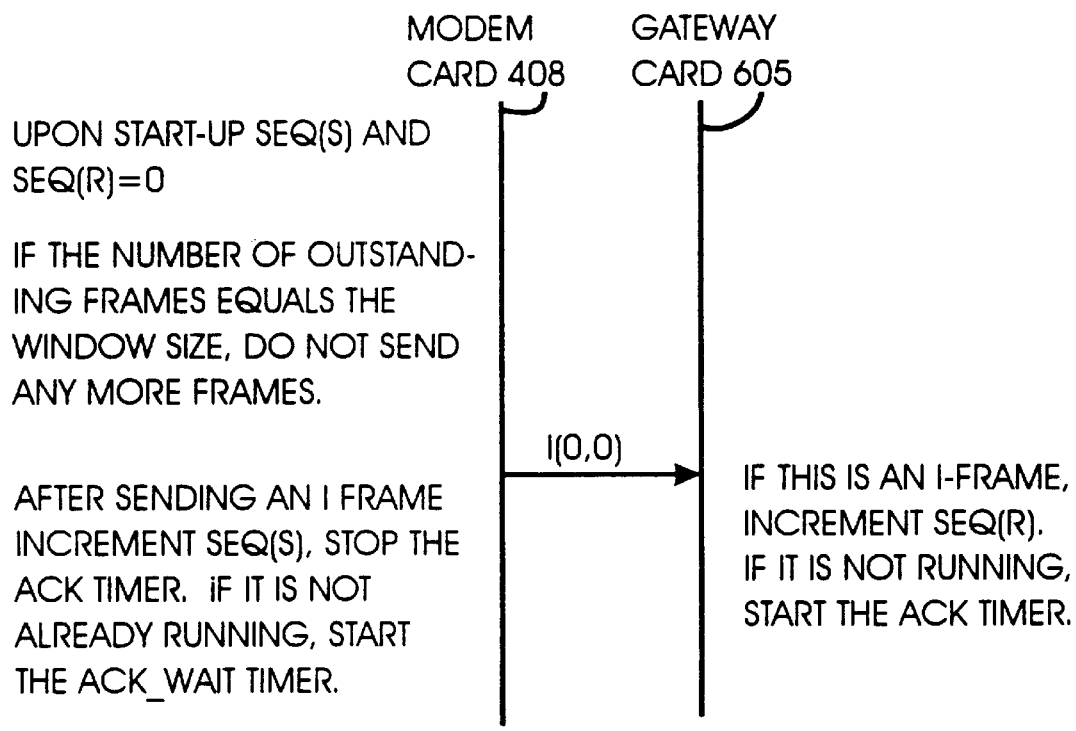
FIG. 14C is a flow diagram showing functions performed to maintain flow control between the modems and the gateway card illustrated in FIG. 3.

FIG. 14C is a call flow diagram depicting the functions performed on each card to maintain flow control between gateway card 605 and modem cards, such as card 408.

Figure 14D:
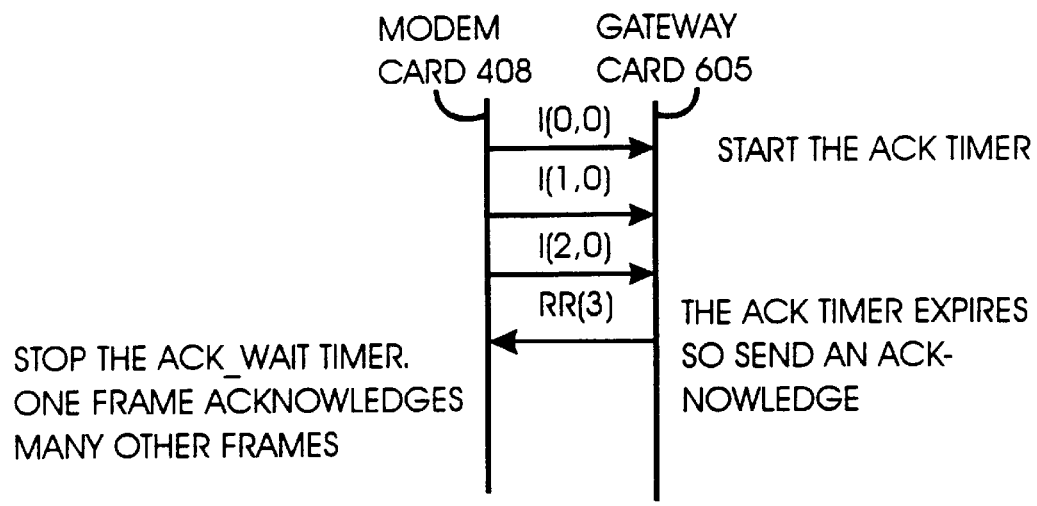
FIG. 14D is a flow diagram showing signal traffic between the modems and the gateway card illustrated in FIG. 3.
Figure 14E:
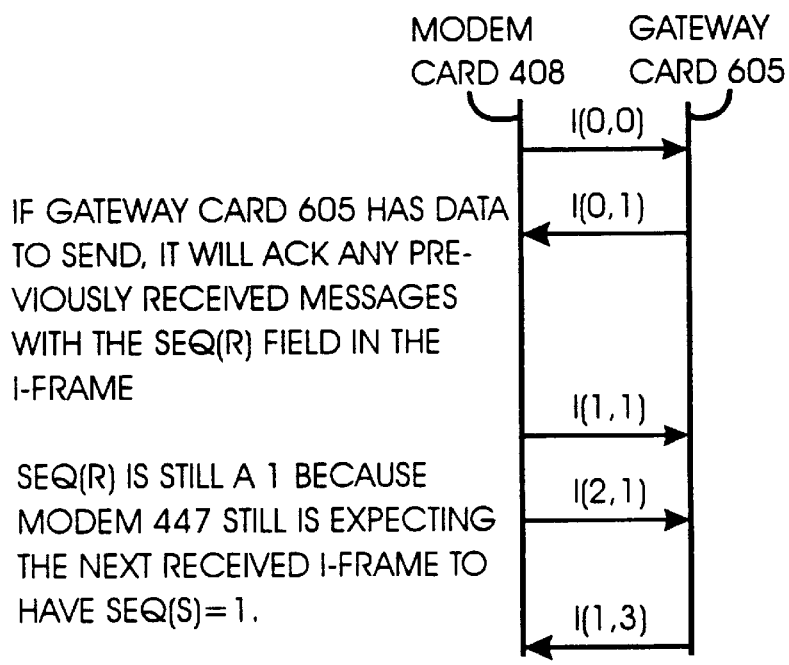
FIG. 14E is a flow diagram showing data flowing in both directions between the modems and the gateway card illustrated in FIG. 3.

FIG. 14D is a data flow diagram depicting the traffic between gateway card 605 and modem 447 on card 408. Data is predominantly moving from modem 447 to gateway card 605. After receiving the first I frame, gateway card 605 starts the ACK timer if it is not already running. If gateway card 605 has no I frames to send, the ACK timer expires and card 605 sends an acknowledge. The receive sequence number is 3, indicating that the next expected sequence number in a received frame is 3.

In FIG. 14D, gateway card 605 sends an RR frame with a receive sequence number of 3. Seq(r) identifies the next expected I frame, not the last received I frame. If gateway card 605 would have sent an I frame to modem 447, card 605 would have used the value of 3 for Seq(r).

In FIG. 14D, if gateway card 605 had sent an RR with Seq(r)<3, modem 447 would not have stopped the ACK_WAIT timer. Instead, the modem would have restarted the ACK_WAIT timer. The ACK_WAIT timer is only stopped when a frame is received with Seq(r) one greater than the Seq(s) of the last transmitted frame.

FIG. 14E is a flow diagram in which data is transversing the packet bus in both directions between modem 447 and gateway card 605. Although gateway card 605 starts the ACK timer when it receives an I frame, the timer never expires. This is because the timer is stopped when gateway card 605 sends an I frame to modem 447. Because the I frame serves as an acknowledgement, there is no longer a need to send another acknowledge frame after the I frame is sent.

Assume that computer C13 is the host computer for network TRN1. The operation of the network control module 601 and packet bus 501 will be described in connection with the following terms and abbreviations:

pBusHndlr is a software subsystem performing packet bus data link level handling functions;

pBusAPI is a software subsystem handling all application interfaces to the packet bus via pBusHndlr;

CM is a connect manager that establishes initial modem connection and monitors incoming calls;

PM is a protocol manager that configures a modem before answering an incoming call;

C/PM is a connect/protocol manager;

FM is a frame manager, a software subsystem handling the packing and unpacking of TRN1 bound frames, implemented as FTM and FRM;

FTM is a frame transmit manager, a portion of the FM subsystem handling the transmission of data from gateway application card 605 onto TRN1, implemented as a stand alone task;

FRM is a frame receive manager, a portion of the FM subsystem handling the receiving of data from TRN1 onto card 605, implemented as a stand alone task;

AIC is an administration information cluster, a global information reservoir accessible by all card 605 software subsystems;

PAP is a packet bus application protocol—used by card 605 to communicate with external devices over packet bus 501; and AMMODs are application modules, including C/PM and FM. (AMMOD is synonymous with "application module.")

Referring to FIG. 14, there are six key software subsystems making up most of the software functional requirement of gateway application card 605: packet bus handler (pBusHndlr) 811, packet bus/modem API (pBusAPI) 813, connect/protocol manager (C/PM) 815, frame manager (FM) 817, a transmission control protocol/internet protocol (TCP/IP) manager 819 and a timer task 820. The subsystems control sequencing by reading and leaving messages in software queues 821–826, and are implemented as independent tasks, functioning as service providers, service users, or both. C/PM 815 provides services to the TRN1 host computer C13, utilizing the services of pBusAPI 813 and FM 817. pBusAPI 813 provides services to AMMODs 816, which include C/PM 815, utilizing the services of pBusHndlr 811. FM 817 provides services to AMMODs 816, utilizing the services of the TCP/IP manager 819. Timer task 820 initiates timer service requests to start "blocked" operations. These "blocked" operations are functions waiting on shared resources as functions that have been delayed a specific amount of time.

Assume a phone call intended for computer C13 comes in from computer C1 on line T1 through modem 447 (FIG. 7). Server NAS1 is capable of enabling simultaneous communication between any pair of computers from the groups C1–C12 and C13–C24. Therefore, the communications between any of the pairs of computers is apparent from a description of the communications between computer C1 and computer C13.

Modem 447 demodulates the call setup information generated by computer C1 and sent to line T1 to form a digital network bus signal message comprising packets of digital time-spaced signals representing the call setup information. The call setup information includes signals that identify computer C13 as the destination for the data from computer C1 and also identify the telephone number assigned to computer C1. The message is transmitted over packet bus 501 in order to notify pBusAPI 813 (FIG. 14) by sending the message through pBusHndlr 811. After the message is assembled and stored in queue 822 (FIG. 14), pBusAPI 813 translates and analyzes the message and extracts the calling phone number (i.e., the phone number assigned to computer C1. This phone number is passed along to C/PM 815, which uses it to determine the line and modem protocol for modem 447.

The protocol management (PM) function of C/PM 815 looks up the protocol parameters associated with the phone number of computer C1 and configures modem 447 by passing command requests to pBusAPI 813. Any of the set mode parameters described later in this specification can be used to set the modem standard used by modem 447. This is a unique advantage which enables precise software control over modem module 401 and enables any of the modems to be tailored to handle an incoming call efficiently. pBusAPI 813 translates the commands into PAP format and sends them to modem 447 via pBusHndlr 811. Modem 447 then demodulates the telephone signals from computer C1 according to the modulation standard dictated by the set mode parameters transmitted to modem 447 over packet bus 501.

In the same manner, responses from modem 447 are relayed to C/PM 815. If the configuration was successful, C/PM 815 picks up the phone call by requesting modem 447 to answer it. If modem 447 answers the call successfully, C/PM 815 notifies TRN1 host computer C13 that a call is successfully connected and data is forthcoming. To do so, C/PM 815 sends a start-of-call message to frame manager (FM) 817, which in turn converts it to a special format before forwarding the message to host computer C13.

The TCP/IP protocol is employed to provide an end-to-end connection-oriented path to host computer C13. TCP/IP is a common protocol used for local area networks, such as network TRN1. Other protocols could be substituted for TCP/IP. At the point of transmission, FM 817 submits the TRN1 bound message to TCP/IP manager 819 which puts the data from computer C1 into the TCP/IP protocol used by network TRN1. The data is routed to computer C13 by TRN1 and can be displayed or processed by computer C13. Since modem 447 now links computer C1 with computer C13, data is transmitted from computer C13 to computer C1 by the reverse of the above-described procedure. This completes an incoming call cycle.

For an outgoing call, assume that a phone call comes in from computer C14 on TRN1 that is to be routed to computer C2. The network TRN1 signals from computer C2 are in the TCP/IP protocol used by TRN1. In general, the network signals comprise blocks of digital time-spaced signals that include call setup information identifying a phone number associated with computer C14 and a phone number associated with computer C2. After the network signals are stored in queue 822 (FIG. 14), pBusAPI 813 translates and analyzes the signals and extracts the calling phone number. This phone number is passed along to C/PM 815 which uses it to determine the modem protocol for modem 448 which is assigned to the call. The protocol management (PM) function of C/PM 815 looks up the protocol parameters associated with the phone number of computer C14 and configures modem 448 by passing command requests to pBusAPI 813. Any of the set mode parameters described later in this specification can be used to set the modem standard used by modem 448. pBusAPI 813 translates the commands into PAP format and sends them to modem 448 via pBusHndlr 811. Modem 448 then modulates the network signals from computer C14 according to the modulation standard dictated by the set mode parameters transmitted to modem 448 over packet bus 501. In the same manner, responses from modem 448 are relayed to C/PM 815. If the configuration was successful, C/PM 815 picks up the phone call by requesting modem 448 to answer it. If modem 448 answers the call successfully, C/PM 815 asks modem 448 to notify computer C2 that a call is successfully connected and data is forthcoming. Computer C2 is notified by standard EIA signalling used by standard modems over an RS232 bus.

Computers C2 and C14 are linked via line T1 and telephone network TC1 in the manner previously described. Computer C2 and C14 have full duplex communication capability via modem 448.

For both incoming and outgoing calls, communications between network TRN1 and the modems operate under control of pBusAPI. For purposes of the following description, it is assumed that modem 447 (FIG. 7) is assigned to the communication. The pBusAPI subsystem reads from its own message queue 822 to obtain commands from AMMOD, converts the commands to a PAP message, and sends it to the modem by placing the PAP message in pBusHndlr's message queue 821. pBusAPI also reads modem responses in PAP message format from its own queue 822, converts them to DE equivalent before replying to AMMOD 816.

pBusAPI tasks are created at system initialization. There is a pBusAPI task for every C/PM task. Each pBusAPI task and C/PM task has its own message queue 822 to receive input. To output messages, a task simply sends them to the destination task's input queue.

pBusAPI subsystem 813 is partitioned into three major functional code segments: parameter verification, command processing and protocol conversion. pBusAPI verifies the parameters loaded into a command control blocks (CCBs) by checking for null pointer values and range checking for non-pointer parameters.

Protocol conversion is required because pBusAPI and an associated modem communicate using the packet bus application protocol (PAP). The CCB is converted into a PAP message before sending to a modem. Likewise, responses from the modem are translated from a PAP message.

Response from the modem is treated as the equivalent of a device end (DE) completion status signal, which is intercepted by pBusHndlr and placed into pBusAPI's input message queue 822. Upon receipt, pBusAPI examines the completion status (DE), translates it to the appropriate DE value, and relays it back to the application. There is an acknowledgement for every PAP frame sent by pBusAPI to modem 447 via pBusHndlr 811.

For a token ring network application, PAP is used to facilitate communications over packet bus 501 with the modems on quad modem cards 403–408. Source and destination address is supplied by the pBusHndlr subsystem, through which all data traffic between the modem and pBusAPI will channel.

A PAP frame (hereafter referred to as a PAP message) is made up of two sections: (1) the control word, and (2) the indicators section. Layout of the indicators section can be any mixture of indicators only, individual indicators followed by infobytes, and individual indicators followed by instance specifier and/or infobytes.

Modem commands are translated to a PAP message by pBusAPI and submitted to pBusHndlr for transmission.

AMMOD submits a command request in the form of a command control block (CCB)(FIG. 15). Multiple CCBs can be chained together and submitted. However, pBusAPI will traverse the chain and execute each CCB individually. Some modem commands require additional parameters, which are contained in a command block extension (CBX) (FIG. 16), linked to the CCB. To specify even more parameters, a formatted option block (FOB) is used, the address of which is stored in CBX.

To submit modem commands, AMMOD invokes the library function nas_modem_request0, which performs parameter checking on the CCBs before posting it on pBusAPI's queue 822.

The CCB and CBX blocks illustrated in FIGS. 15–16 include the following parameters:

Command Control Block (CCB)

| Parameter | Description |
| --- | --- |
| CCB_CMD | Command code |
| CCB_MW | Target modem ID (1–24) |
| CCB_FLAGS | CCB specific flags (CCB_CHAIN indicates CCB_CB is populated) |
| CCB_CBX | Pointer to a CBX (six bytes long) |
| CCB_CCB | Pointer to next CCB in chain |
| CCB_DE | Completion (device end) status |
| CCB_RC | Reason code |
| CCB_RCX | Additional reason code |
| CBX_FLAGS | CBX specific flags (CBX_FOBV indicates CBX_BUFF_FOB is populated. CBX_CRC generates CRC for outgoing data when CCB_CMD is XMIT.) |
| CBX_BCOUNT | Byte count (number of bytes: (1) to receive; (2) to send, or (3) size of FOB) |
| CBX_BUFF_FOB | Pointer to XMIT/RECV buffer or FOB |
| CBX_TIMER1 | Timer 1 in milliseconds |
| CBX_TIMER2 | Timer 2 in milliseconds |

Each number preceded by plus signs on the left side of FIGS. 15–16 (as well as FIGS. 19–22 and 25–27) identifies the starting bit of the word described to the right of the number.

After the CCB parameters and any associated CBX parameters are validated for accuracy, the CCB command is entered into the pBusAPI state machine for processing. A CCB command is an external event to pBusAPI that may alter its internal operating state, and may trigger event notification to other subsystems. The state transition table in the next section of this specification details the handling of each event/command.

Referring to FIG. 14A, the pBusAPI subsystem operates in four basic states: SESSION_OPEN, SESSION_CLOSED, CALL_LISTEN and LINK_CONNECTED. Upon start-up, pBusAPI is at the SESSION_CLOSED state. At this state, no command from AMMOD is processed, except for the OPEN command. Upon receiving an OPEN command, pBusAPI will attempt to establish a connection to the modem through packet bus 501 via pBusHndlr 811. If successful, pBusAPI returns a successful DE value to AMMOD 816, and changes state to SESSION_OPEN. When a CLOSE command is received from AMMOD, pBusAPI tears down the packet bus connection and changes state to SESSION_CLOSED.

In the SESSION_OPEN state, a logical session has been established with AMMOD and a packet bus connection has been established with a modem. However, in this state, the modem does not have an active phone connection setup and therefore any AMMOD request to transmit data over the link will be denied. AMMOD issues the LISTEN command to cause pBusAPI to change to the CALL_LISTEN state.

In the CALL_LISTEN state, pBusAPI is expecting a phone call to come in through the modem (e.g., modem 447) and thus establish an active phone connection. For pBusAPI to be in this state, it is most likely that AMMOD has just issued a CCB chain in the command order of LISTEN, SETMODE and ANSWER. The SETMODE command will not be carried out until a call has arrived at the modem. Not until the modem has successfully configured itself with the SETMODE parameters values will the incoming call be picked up. The ANSWER command will take the call off-hook and cause pBusAPI to change to LINK_CONNECTED state.

In the LINK_CONNECTED state, an active end-to-end phone connection has been established between a remote calling endpoint (e.g., computer C1) and the pBusAPI task. This enables AMMOD to transmit and receive data over the modem link to and from the remote endpoint. This modem link will remain connected until AMMOD disconnects it, thereby hanging up the phone connection. At this point, pBusAPI will return to the SESSION_OPEN state.

In summary, pBusAPI uses the state transition table to (1) enforce the order and context of AMMOD command requests; and (2) flag invalid responses from the pBusHndlr. A state transition, if necessary, will always occur after a CCB command is successfully executed. This means transition takes place only after the modem replies with a PAP message indicating successful execution. A state transition is represented by event/action. The event triggers the transition. The action is taken as a result of the event. No action is taken if none is specified.

After translating a modem command (CCB) into PAP indicators and packing them into a PAP message, the PAP message is chopped contiguously into fragments. Each fragment is the same size as a packet bus packet. These packets are then chained together into a list and submitted to pBusHndlr for transmission to the modem over packet bus 501. In the same manner, the modem replies in the form of a PAP message, but the message is chopped into a linked list of packets. When pBusAPI requests to receive a message, pBusHndlr satisfies the request by returning a pointer to the linked list received. It is up to pBusAPI to reassemble the list into a PAP message.

A messaging mechanism is used for interfacing between pBusHndlr and pBusAPI. Except for one instance, pBusAPI always initiates a request message, and pBusHndlr always replies with an acknowledgement message. pBusHndlr guarantees acknowledgement. Therefore, there is no timeout required between request and acknowledgement messages.

Although not explicitly drawn, all pBusHndlr service request and acknowledgement message structures are preceded by four signature bytes. The content of the signature bytes is populated by the client process executed by host computer C13 and remains transparent to pBusHndlr for all message exchanges. Usage of the signature bytes includes message sequence number, asynchronous message identification and related parameters.

Whenever pBusHndlr replies with an acknowledgement message, it means that the requesting message has been transmitted over the packet bus and received by the modem. However, this does not imply acceptance of the request by the modem. The status as a result of modem execution is returned as a separate PAP message.

pBusHndlr provides datalink layer services over packet bus 501 and an application interface similar to the Berkeley sockets. After a connection is made, pBusAPI receives a designated socket descriptor with which pBusHndlr can identify all future data traffic between a particular pBusAPI task and a modem.

Figure 17:
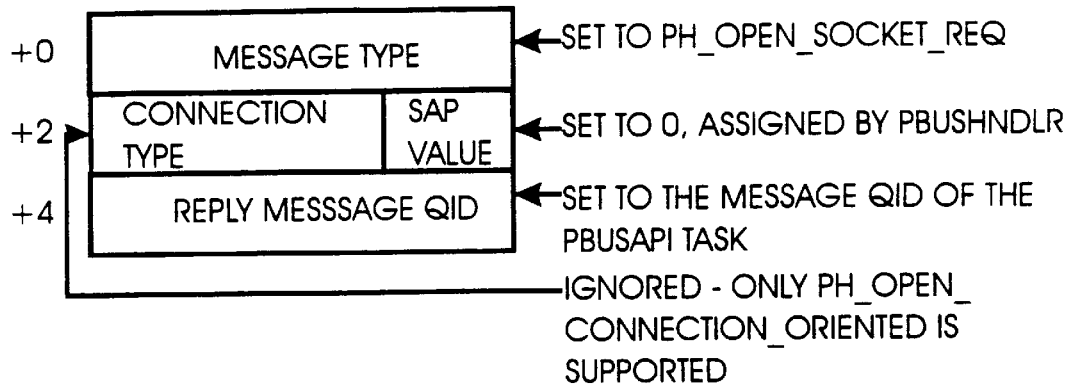
FIG. 17 is a schematic diagram of a preferred form of message type PH Open Socket_Req used by the programs illustrated in FIG. 14.
Figure 18:
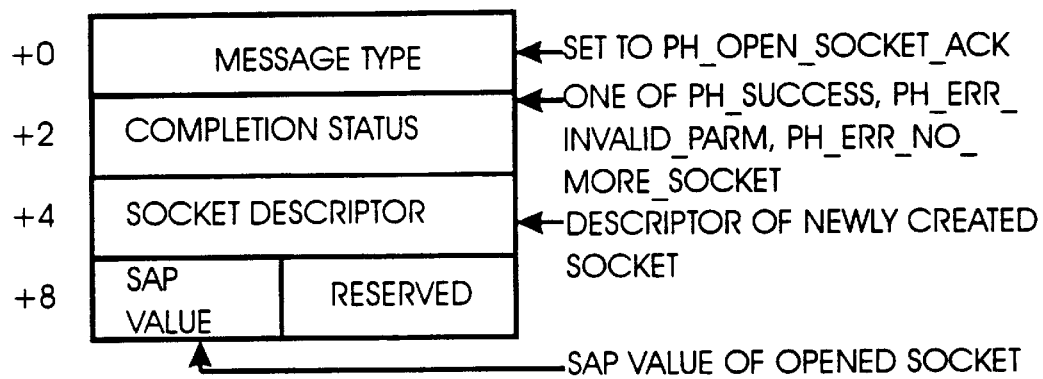
FIG. 18 is a schematic diagram of a preferred form of message type PH Open Socket_Ack used by the programs illustrated in FIG. 14.
Figure 19:
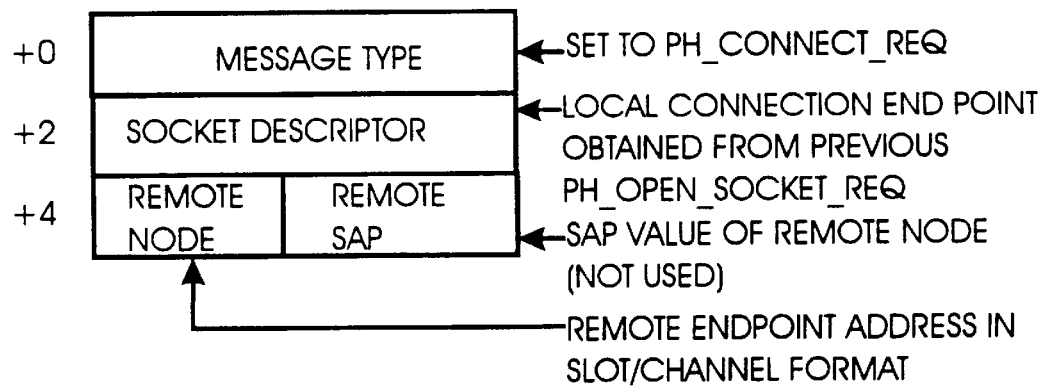
FIG. 19 is a schematic diagram of a preferred form of message type PH Connect_Req used by the programs illustrated in FIG. 14.

Creating a connection with a modem that is ready for sending and receiving data involves two steps. First, a socket needs to be created. This is done by sending pBusHndlr a 'PH_OPEN_SOCKET REQ' message (FIG. 17) and receiving a 'PH_OPEN_SOCKET_ACK' reply (FIG. 18). Second, a physical data pipe needs to be established. This is done by sending pBusHndlr a 'PH_CONNECT_REQ' (FIG. 19) and receiving a 'PH_CONNECT_ACK' reply (FIG. 20).

Once a socket connection is established, data can be transmitted over packet bus 501 by sending a PH_SEND_REQ (FIG. 21) message to pBusHndlr and receiving a PH_SEND_ACK reply (FIG. 22). An element of the PH_SEND_REQ message header (FIG. 21) points to the list of linked fragments of a PAP message, which contains the data to be sent onto the modem link. The memory occupied by the linked list is allocated by pBusAPI when it builds the list. pBusHndlr has the responsibility to free this memory when it is done with the linked list.

A PAP message is fragmented into packet bus packets before submitting to pBusHndlr for transmission. pBusHndlr also presents messages received from the modem to pBusAPI in the same manner.

FIGS. 23–24 depict the fragmentation process employed by pBusAPI. FIG. 23 assumes a PAP message length of 1024 bytes and a packet bus packet size of 256 bytes. FIG. 23 shows a sample PAP message (not to scale) being fragmented. FIG. 24 shows how the fragments created by the process of FIG. 23 are linked together. The 'data_ptr' shown in FIG. 24 is passed to pBusHndlr in the 'data pointer' field of the PH_SEND_REQ message (FIG. 21).

Once a socket connection is established, data can be received from the modem over packet bus 501 by sending the PH_RECEIVE_REQ message (FIG. 25) to pBusHndlr and receiving a PH_RECEIVE_ACK reply (FIG. 27). An element of the PH_RECEIVE_ACK message header points to the list of linked fragments of a PAP message, which contains the data that was received by the modem. The memory occupied by the linked list is allocated by pBusHndlr when it builds the list. pBusAPI has the responsibility to free this memory when it is done with the linked list.

If no data was available for receiving at the time of the request, pBusHndlr immediately returns a PH_RECEIVE_ACK message (FIG. 27) with the number of received bytes set to zero. Later on when a complete message has arrived from the modem, pBusAPI submits a PH_RECEIVE_REQ message (FIG. 25) to receive it.

Commands from AMMOD are translated to equivalent PAP command indicators. In most cases, there will not be a one-to-one mapping and AMMOD requires a series of PAP indicators to carry out the command. The following is the mapping between the two command sets:

| Modem API Commands | PAP Control Word |
|---|---|
| OPEN | none |
| CLOSE | none |
| XMIT | DATA |
|  | EVENT |
|  | SERVICE REQUEST |
| RECV | DATA |
|  | QUERY |
| LISTEN | EVENT |
| ANSWER | SERVICE REQUEST |
| DISCONNECT | SERVICE REQUEST |
| FLUSH | none |
| KILL | none |
| SETMODE | CONFIGURE |

When 'none' appears in the PAP indicator column, the corresponding modem API commands are for logical operations between AMMOD and pBusAPI and have no effect on the modem.

All modem configuration indicators and their values can be sent in one or more unsolicited PAP messages under the CONFIGURE control word.

The following PAP command/indicators are sent to setup the default operating environment in the modem by pBusAPI upon start-up:

| PAP Indicators | Default Value |
|---|---|
| CALL_DESTINATION | Packet bus address of TRC at modem connection setup |
| MODEM_TDM_SLOT | Automatically determined by modem |
| DNIS_AT_STRING | None specified |
| BILLING_DELAY | 2 seconds |
| ANSWER_TONE_DURATION | Minimum allowed by CCITT (2600 ms) |

In addition, pBusAPI configures the modem with the default SETMODE values listed below at start-up. The modem is also configured on a per call basis by C/PM. Whenever a pBusAPI returns a successful LISTEN to C/PM, it replies with a SETMODE command containing all the modem parameter values to be configured. The SETMODE parameters are translated to PAP indicators using the following mapping. If no value is specified for a SETMODE field, the default value is used.

| SETMODE Parameters | PAP Indicators |
|---|---|
| SOB_PARITY | LNK_PARITY |
| SOB_EVENP | LNK_PARITY |
| SOB_FDX | LNK_DUPLEX |
| SOB_CRC12 | BCC_TYPE |
| SOB_CRC16 | BCC_TYPE |
| SOB_LRC | BCC_TYPE |
| SOB_NRZI | LINE_ENCODING |
| SOB_AT | EXEC_AT_STRING |
| SOB_TRAIN | LNK_MODULATION |
| SOB_B103 | LNK_MODULATION |
| SOB_B212 | LNK_MODULATION |
| SOB_V22BIS | LNK_MODULATION |
| SOB_V32 | LNK_MODULATION |
| SOB_V32BIS | LNK_MODULATION |
| SOB_B208 | LNK_MODULATION |
| SOB_VFAST | LNK_MODULATION |
| SOB_MNPDEF | LNK_MNP |
| SOB_MNP4 | LNK_MNP |
| SOB_MNP5 | LNK_MNP |
| SOB_BIT | LNK_CHAR_SIZE |
| SOB_STOPB | LNK_STOP_BITS |
| SOB_ADT | EXEC_AT_STRING |
| SOB_STIMER | SYNC_INSERT_TIMER |
| SOB_ITIMER | INTER_CHAR_DELAY |
| SOB_COD | COD_CHAR |
| SOB_IDLE | IDLE_CHAR |
| SOB_FFLAG | FFLAG_CHAR |
| SOB_SYNC | SYNC_CHAR |
| SOB_BOB | BOB_CHAR |

The BOB parameter defines beginning-of-block character(s), i.e., character(s) prepended to a data block. The COD parameter defines change-of-direction character(s), i.e., character(s) appended to a data block. The FFLAG parameter defines framing flag character(s) used in bit-oriented protocols. The SYNC parameter defines a sync character (e.g., SYN in BSC). The IDLE parameter defines character(s) transmitted or received when no outgoing or incoming data is present.

Messages from a modem arrive via packet bus 501 through the pBusHndlr subsystem in PAP message format. These messages belong to one of two categories: (1) a response to a previous pBusAPI request, or (2) an unsolicited message notifying pBusAPI of an asynchronous event, such as RECVD_DATA In all cases, responses from the modem are translated to an equivalent DE value whenever applicable. pBusAPI puts this DE value in the 'DE' field of the corresponding CCB (CCB_DE)(FIG. 15). Additional return values are stored in fields CCB_RC and/or CCB_RCX as tabulated below. For all modem API commands not shown in the table, no CCB_RC nor CCB_RCX is returned.

| Modem Command | CCB_DE | CCB_RC | CCB_RCX |
|---|---|---|---|
| OPEN | AE | Failure reason code | n/a |
| CLOSE | AE | Failure reason code | n/a |
| XMIT | AE or NC | Failure reason code | Actual bytes sent |
| RECV | Error matrix | Error matrix | Error matrix |

Those skilled in the art will recognize that the preferred embodiment described in the specification may be altered and modified without departing from the true spirit and scope of the invention as defined in the following claims.

I claim:

1. In a system comprising a multiplexed digital telephone line carrying a digital first telephone signal resulting from modulation of a first digital computer signal representing digital first data from a digital first computer, said telephone line also carrying a digital second telephone signal resulting from modulation of a second digital computer signal representing digital second data from a digital second computer, said system also comprising a network for receiving a digital first network signal comprising blocks of digital signals representing digital third data from a digital third computer and for receiving a digital second network signal comprising blocks of digital signals representing digital fourth data from a digital fourth computer, improved communication apparatus for enabling bilateral transmission of said digital data between said digital telephone line and said network, comprising in combination:

a telephone control interface responsive to said first telephone signal generating a digital first telephone bus signal representing said first data and responsive to said second telephone signal generating a digital second telephone bus signal representing said second data;

a network control interface responsive to said first network signal generating a digital first network bus signal representing said third data and responsive to said second network signal for generating a digital second network bus signal representing said fourth data;

a first modem responsive to said telephone control interface and said network control interface modulating said first network bus signal to form a digital third telephone bus signal representing said third data and demodulating said first telephone bus signal to form a digital third network bus signal representing said first data;

said first modem modulating said first network bus signal to form said digital third telephone signal representing said third data without conversion of said third data to an analog telephone signal;

a second modem responsive to said telephone control interface and said network control interface for modulating said second network bus signal to form a digital fourth telephone bus signal representing said fourth data and for demodulating said second telephone bus signal to form a digital fourth network bus signal representing said second data;

said second modem modulating said second network bus signal to form said digital fourth telephone bus signal representing said fourth data without conversion of said fourth data to an analog telephone signal;

a telephone bus responsive to said telephone control interface for transmitting said first and third telephone bus signals between said telephone control interface and said first modem and for transmitting said second and fourth telephone bus signal between said telephone control interface and said second modem; and a network parallel bus responsive to said network control interface transmitting said first and third network bus signal between said network control interface and said first modem and transmitting said second and fourth network bus signals between said network control interface and said second modem;

whereby said first and third computers bilaterally communicate via said telephone line while said second and fourth computers bilaterally communicate via said telephone line.

2. An all-digital network access server connecting remote computers generating digital data to a network computer on a local or wide area network via a digital telephone line, comprising:

a plurality of modems comprising at least a first modem;

a telephone control interface receiving a plurality of multiplexed incoming calls on said digital telephone line and demultiplexing said plurality of incoming calls into time-spaced digital telephone bus signals representing said digital data from said remote computers;

a telephone bus connected to said telephone control interface transmitting said time-spaced digital telephone bus signals from said telephone control interface to said modems, including said first modem;

a digital signal processor system in said first modem demodulating said time-spaced digital telephone bus signals into incoming binary data, without conversion of said data to analog form;

a parallel bus connected to said digital signal processing system; and a network gateway controller coupled to said modem by said parallel bus and receiving said incoming binary data from said first modem on said parallel bus, said network gateway controller placing said incoming data in a format compatible with said local area network for transmission on said local area network to said network computer.

3. The network access server of claim 2, wherein said network gateway controller further comprises a protocol manager placing said incoming binary data into a format compatible with said local area network and an interface operatively connected to said local area network and responsive to said protocol manager for placing said incoming binary data onto said local area network.

4. The network access server of claim 2, wherein said network gateway controller receives packets of data from said network computer destined for said remote computers via said digital telephone line, and places data on said parallel bus representing said data from said network computer for transmission to said first modem;

and wherein said first modem modulates said data from said network computer into second digital telephone bus signals representing said data from said network computer, without conversion of said data from said network computer into analog form.

5. The network access server of claim 4, wherein said telephone bus delivers said second digital telephone bus signals to said telephone control interface for placement on said digital telephone line for transmission to a remote computer.

6. An all-digital network access server for receiving and transmitting calls representing digital data between a multiplexed digital telephone line and a computer network having at least one computer in communication therewith, comprising:

a time division multiplexed bus organized into a plurality of time slots;

a plurality of modems, each of said modems coupled to said time division multiplexed bus;

a network interface for receiving packets of said digital data from said network and for transmitting packets of said digital data onto said network;

a parallel bus coupling said modems to said network interface;

a telephone line interface module coupling time slots of said digital telephone line to said time slots on said time division multiplexed bus; and a plurality of processors associated with said plurality of modems for modulating and demodulating calls between said telephone line and said at network without conversion of said digital data to analog form, whereby the efficiency of transmission of said digital data between said telephone line and said at network may be improved.

7. The all-digital network access server of claim 6, wherein the bandwith of said parallel bus is available to each of said modems in said plurality of modems.

* * * * *